(12) United States Patent
Rushkin et al.

(10) Patent No.: US 12,020,593 B2
(45) Date of Patent: Jun. 25, 2024

(54) AUTOMATED EVALUATION OF FREE-FORM ANSWERS AND GENERATION OF ACTIONABLE FEEDBACK TO MULTIDIMENSIONAL REASONING QUESTIONS

(71) Applicant: BrainPOP IP LLC, New York, NY (US)

(72) Inventors: Ilia P. Rushkin, Cambridge, MA (US);
Yigal Rosen, Brookline, MA (US);
Sara Bakken, Houston, TX (US);
Michelle Newstadt, Pittsburgh, PA (US)

(73) Assignee: BRAINPOP IP LLC, New York, NY (US)

( * ) Notice: Subject to any disclaimer, the term of this patent is extended or adjusted under 35 U.S.C. 154(b) by 0 days.

(21) Appl. No.: 18/234,134

(22) Filed: Aug. 15, 2023

(65) Prior Publication Data
US 2024/0054909 A1  Feb. 15, 2024

Related U.S. Application Data

(60) Provisional application No. 63/397,971, filed on Aug. 15, 2022.

(51) Int. Cl.
| G09B 7/00 | (2006.01) |
| G06F 40/232 | (2020.01) |
| G06F 40/253 | (2020.01) |
| G06Q 50/20 | (2012.01) |
| G09B 7/04 | (2006.01) |

(52) U.S. Cl.
CPC .............. *G09B 7/04* (2013.01); *G06F 40/232* (2020.01); *G06F 40/253* (2020.01); *G06Q 50/20* (2013.01)

(58) Field of Classification Search
CPC ............ G09B 7/02; G09B 7/04; G06F 40/253
See application file for complete search history.

(56) References Cited

U.S. PATENT DOCUMENTS

| 7,831,196 B2 * | 11/2010 | Attali ...................... G09B 7/00 434/353 |
| 9,576,498 B1 * | 2/2017 | Zimmerman ............ G09B 7/02 |
| 10,186,168 B2 | 1/2019 | Gobert et al. |
| 11,049,409 B1 * | 6/2021 | Zhang .................. G06F 40/253 |
| 11,151,894 B1 * | 10/2021 | Beigman Klebanov ..................... G06F 40/253 |
| 11,449,762 B2 | 9/2022 | Rosenstein et al. |
| 11,475,245 B2 | 10/2022 | Foltz et al. |
| 2003/0138758 A1 * | 7/2003 | Burstein ................ G09B 11/00 434/167 |

(Continued)

OTHER PUBLICATIONS

Zambrano, Andres Felipe, et al. "From nCoder to ChatGPT: From Automated Coding to Refining Human Coding." (2023).

(Continued)

*Primary Examiner* — Peter R Egloff
(74) *Attorney, Agent, or Firm* — Gardella Grace P.A.

(57) ABSTRACT

In an illustrative embodiment, methods and systems for automatically evaluating content of freeform text answers involve obtaining sections of text answering a multi-dimensional reasoning question, analyzing section content of each section using AI model(s), analyzing logical connections between the sections of text, and calculating score(s) corresponding to the freeform answer based on the analyses.

19 Claims, 16 Drawing Sheets

(56) References Cited

U.S. PATENT DOCUMENTS

| | | | |
|---|---|---|---|
| 2004/0175687 A1* | 9/2004 | Burstein | G09B 7/02 434/353 |
| 2005/0049867 A1* | 3/2005 | Deane | G10L 15/1822 704/240 |
| 2005/0142529 A1* | 6/2005 | Andreyev | G09B 7/02 434/323 |
| 2005/0143971 A1* | 6/2005 | Burstein | G06F 40/284 704/4 |
| 2005/0149364 A1* | 7/2005 | Ombrellaro | G06F 3/011 705/3 |
| 2005/0277103 A1* | 12/2005 | Townshend | G09B 7/00 434/323 |
| 2006/0194183 A1* | 8/2006 | Attali | G09B 7/06 434/362 |
| 2013/0209983 A1 | 8/2013 | Brown | |
| 2015/0248397 A1* | 9/2015 | Burstein | G06F 40/35 704/9 |
| 2019/0180641 A1* | 6/2019 | Donaldson | G09B 19/00 |
| 2019/0259293 A1* | 8/2019 | Hellman | G06N 20/00 |
| 2019/0347949 A1* | 11/2019 | Casa | G09B 7/00 |
| 2019/0370672 A1 | 12/2019 | Funderburk | |
| 2019/0370719 A1* | 12/2019 | Thibodeaux | G06Q 10/063112 |
| 2020/0051451 A1 | 2/2020 | Goyal et al. | |
| 2022/0351635 A1* | 11/2022 | Stroup | G06N 7/01 |
| 2022/0383767 A1* | 12/2022 | Manoria | G09B 7/02 |

OTHER PUBLICATIONS

Sidorov, Grigori, et al. "Syntactic n-grams as machine learning features for natural language processing." Expert Systems with Applications 41.3 (2014).

Riordan, B., Horbach, A., Cahill, A., Zesch, T., & Lee, C. (Sep. 2017). Investigating neural architectures for short answer scoring. In Proceedings of the 12th Workshop on Innovative Use of NLP for Building Educational Applications (pp. 159-168).

Zhao, S., Zhang, Y., Xiong, X., Botelho, A., & Heffernan, N. (Apr. 2017). A memory-augmented neural model for automated grading. In Proceedings of the fourth (2017) ACM conference on learning@ scale (pp. 189-192).

Taghipour, K., & Ng, H. T. (Nov. 2016). A neural approach to automated essay scoring. In Proceedings of the 2016 conference on empirical methods in natural language processing (pp. 1882-1891).

Somasundaran, Swapna, et al. "Towards evaluating narrative quality in student writing." Transactions of the Association for Computational Linguistics 6 (2018): 91-106.

International Search Report and Written Opinion issued in related application PCT/US23/30234 dated Nov. 14, 2023, 8 pages.

* cited by examiner

AUTOMATED EVALUATION OF FREE-FORM ANSWERS AND GENERATION OF ACTIONABLE FEEDBACK TO MULTIDIMENSIONAL REASONING QUESTIONS

RELATED APPLICATIONS

This application claims priority to U.S. Provisional Patent Application Ser. No. 63/397,971, entitled "Automated Evaluation of Free-Form Answers to Multidimensional Reasoning Questions" and filed Aug. 15, 2022. All above identified applications are hereby incorporated by reference in their entireties.

BACKGROUND

Students often interact with computerized learning platforms by typing text answers into response fields of a graphical user interface. To evaluate the student's response, various platforms may automatically apply a list of rubrics to the entered text. However, the scores or grades applied by computerized learning platforms based on such rubrics can vary significantly from the grade or score that would be applied manually (e.g., by a teacher). For example, depending upon the ability level of child learners, the responses will often be "low quality" in terms of formatting (e.g., typographical mistakes, erratic use of punctuation, unorthodox syntaxis, misuse of words having related meanings, etc.). Additionally, rubrics typically estimate use of language (e.g., correctness and sufficient complexity of grammar or vocabulary), while appropriate focus for grading or scoring answers related to various subjects instead require that the responses relate to the appropriate subject and present the correct logical construction.

To overcome the above-noted limitations, the inventors recognized a need for an alternative to analysis via rubrics and for providing timely and actionable feedback to students and teachers. Further, the inventors recognized that a new evaluation mechanism would be needed to accurately apply automated evaluation for recommending further learning resources (e.g., personalized learning) and/or to cluster learners according to proficiency levels.

SUMMARY OF ILLUSTRATIVE EMBODIMENTS

In one aspect, the present disclosure relates to systems and methods for applying machine learning for automatically evaluating the content of student answers to multidimensional reasoning questions formatted in a formal response architecture, such as the claim-evidence-reasoning (CER) structure in science, mathematical reasoning, or argumentative writing in English Language Arts. The machine learning classifiers may be trained to identify relative strength/weakness of coherence of each of the sections (e.g., claim, evidence, and reasoning portions) of a student's answer. Further, the machine learning classifiers may be trained to evaluate logical connections between the claim section and the evidence section, as well as the evidence section and the reasoning section. The answers, for example, may be structured as "mini-essays" involving one or more sentences per section of the CER, mathematical reasoning or argumentative writing structure.

In one aspect, the present disclosure relates to systems and methods for developing training data for training machine learning classifiers to automatically evaluate content of freeform text answers to multidimensional reasoning questions. Converting the text answer to training data may include converting the freeform text answers into tokens representing at least a portion of the content of the freeform text answers. Certain tokens, for example, may be dropped from analysis, such as declaratives and/or punctuation. The tokens may be arranged in a parsing tree format. Attributes or properties of individual tokens, such as word properties of individual tokens and/or dependencies between tokens, may be added to enhance certain individual tokens. Further, the enhanced set of tokens may be converted from parsing tree format to one or more syntactic n-gram forms. The training data may also include metrics representing aspects of the original tokens, the enhanced tokens, and/or the parsing tree format.

In one aspect, the present disclosure relates to systems and methods for training machine learning classifiers to automatically evaluate content of freeform text answers to multidimensional reasoning questions. Ground truth data may include example answers designed and scored by professionals according to a standard scoring rubric. The training may be supplemented through automatically scoring student answers, identifying those answers with very high and/or very low scores applied through the automated machine learning process, and queuing those freeform answers for manual scoring. The manually scored answers may be provided as additional training data to refine the training of the machine learning classifiers. The very high and/or very low scores, for example, may include all freeform answers allocated perfect scores and scores of zero by the automated machine learning-based evaluation. To avoid improper answers, such as incomplete answers, being evaluated with a zero score and then fed through for manual evaluation, each freeform answer may be initially assessed through a first automated process for completeness prior to being presented for automated machine learning evaluation.

The foregoing general description of the illustrative implementations and the following detailed description thereof are merely exemplary aspects of the teachings of this disclosure, and are not restrictive.

BRIEF DESCRIPTION OF THE DRAWINGS

The accompanying drawings, which are incorporated in and constitute a part of the specification, illustrate one or more embodiments and, together with the description, explain these embodiments. The accompanying drawings have not necessarily been drawn to scale. Any values dimensions illustrated in the accompanying graphs and figures are for illustration purposes only and may or may not represent actual or preferred values or dimensions. Where applicable, some or all features may not be illustrated to assist in the description of underlying features. In the drawings.

DETAILED DESCRIPTION OF ILLUSTRATIVE EMBODIMENTS

Figure 1A:
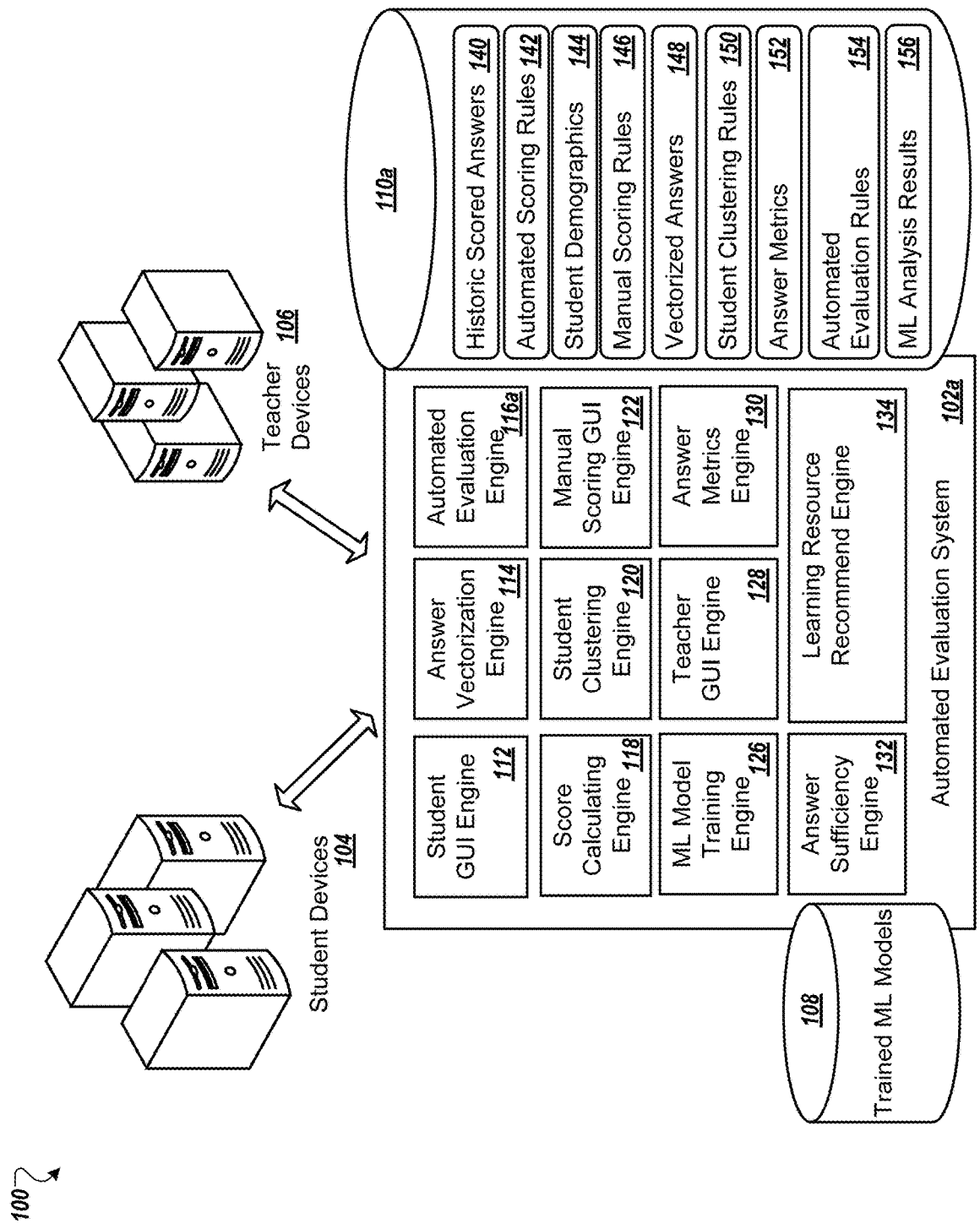
FIG. 1A and FIG. 1B are block diagrams of example platforms for automatically evaluating free-form answers to multi-dimensional reasoning questions.

The description set forth below in connection with the appended drawings is intended to be a description of various, illustrative embodiments of the disclosed subject matter. Specific features and functionalities are described in connection with each illustrative embodiment; however, it will be apparent to those skilled in the art that the disclosed embodiments may be practiced without each of those specific features and functionalities.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments. Further, it is intended that embodiments of the disclosed subject matter cover modifications and variations thereof.

It must be noted that, as used in the specification and the appended claims, the singular forms "a," "an," and "the" include plural referents unless the context expressly dictates otherwise. That is, unless expressly specified otherwise, as used herein the words "a," "an," "the," and the like carry the meaning of "one or more." Additionally, it is to be understood that terms such as "left," "right," "top," "bottom," "front," "rear," "side," "height," "length," "width," "upper," "lower," "interior," "exterior," "inner," "outer," and the like that may be used herein merely describe points of reference and do not necessarily limit embodiments of the present disclosure to any particular orientation or configuration. Furthermore, terms such as "first," "second," "third," etc., merely identify one of a number of portions, components, steps, operations, functions, and/or points of reference as disclosed herein, and likewise do not necessarily limit embodiments of the present disclosure to any particular configuration or orientation.

Furthermore, the terms "approximately," "about," "proximate," "minor variation," and similar terms generally refer to ranges that include the identified value within a margin of 20%, 10% or preferably 5% in certain embodiments, and any values therebetween.

All of the functionalities described in connection with one embodiment are intended to be applicable to the additional embodiments described below except where expressly stated or where the feature or function is incompatible with the additional embodiments. For example, where a given feature or function is expressly described in connection with one embodiment but not expressly mentioned in connection with an alternative embodiment, it should be understood that the inventors intend that that feature or function may be deployed, utilized or implemented in connection with the alternative embodiment unless the feature or function is incompatible with the alternative embodiment.

FIG. 1A is a block diagram of an example platform 100 including an automated evaluation system 102a for automatically evaluating free-form answers to multi-dimensional reasoning questions. The free-form answers may be submitted by students interacting with an e-learning platform via student devices 104.

In some implementations, the automated evaluation system 102a includes a student graphical user interface (GUI) engine 112 for providing learning resources to the student devices 104. The student GUI engine 112 may prepare instructions for causing presentation of interactive student GUI views at a display of the student device. The interactive GUI may include a multi-dimensional reasoning question and/or writing topic description requiring an answer involving multi-dimensional reasoning, along with one or more text entry fields for accepting free-form answers. The interactive student GUI views, for example, may be developed to encourage the student to reflect on learning content provided by the e-learning platform. The GUI views may include other student input fields in addition to text entry fields for accepting free-form answers such as, in some examples, multiple choice questions, matching exercises, word or phrase entry field to simple questions, and/or binary (e.g., yes/no) answer selection fields. The student GUI engine 112 may provide free-form answers to an answer vectorization engine 114 for converting the text to a format for evaluation.

In some implementations, the automated scoring system 102a includes the answer vectorization engine 114 for formatting free-form answers into one or more vector formats for machine learning analysis. The vector formats, in some examples, can include a variety of n-gram formats, described in greater detail as follows. In particular, the free-form answers may be grammatically analyzed into a collection of directed trees, also referred to as a directed graph. In a directed graph G, each weakly-connected component is a directed tree, where no two vertices are connected by more than one path. Each tree of the directed graph G (each weakly-connected component of directed graph G) represents a sentence. The graph vertices V(G) are the words and punctuation marks, and the graph edges E(G) are the grammatical relations, which can be of several types. Hence, each edge has an attribute "dependence type."

Figure 2:
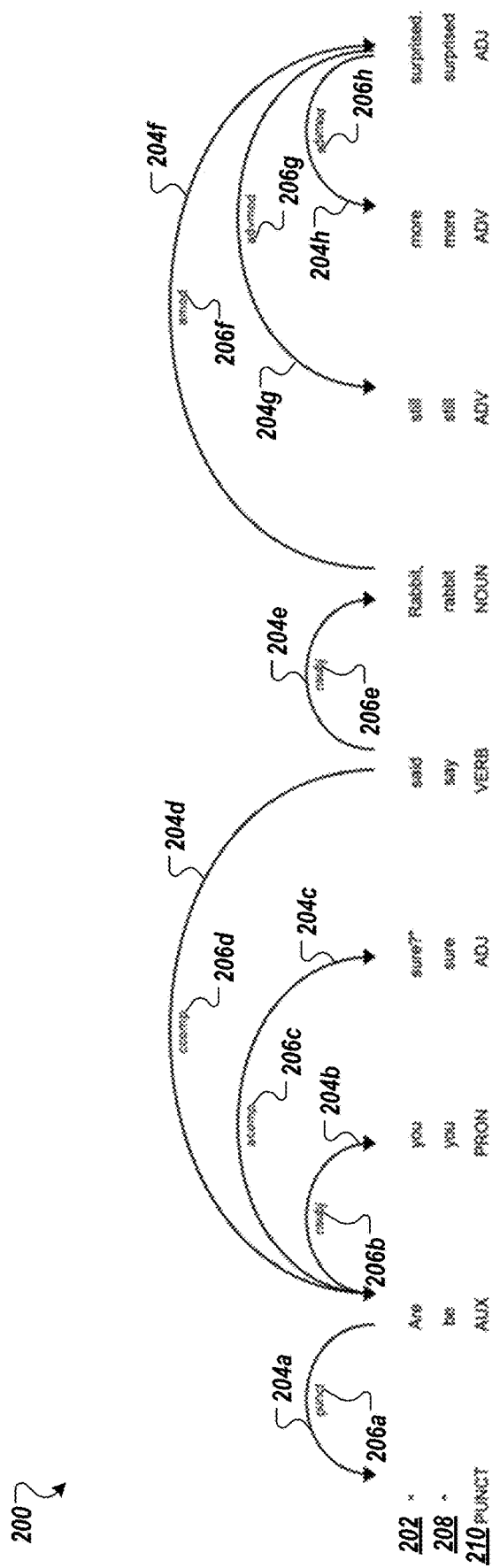
FIG. 2 illustrates an example parsing tree of a sentence into word relationships.

Turning to FIG. 2, an example parsing tree 200 illustrates the mapping of a sentence 202 into word relationships. The parsing tree 200 in FIG. 2 illustrates relationships between elements of the sentence 202 reading—Are you sure?' said Rabbit, still more surprised." Each arrow 204a-h represents an edge of a directed graph of the sentence 202, establishing a grammatical relation. The dependence types 206a-h are shown as arrow labels. Underneath each word or punctuation mark of the sentence 202, its lemma 208 and part of speech 210 is shown.

The most basic way of analyzing a sentence such as the sentence 202 is to consider each word or punctuation mark as a token and the text as a whole as an unordered list of tokens (often referred to as a "bag of words"). Further, punctuation marks are often dropped as part of a text-cleaning portion of automated analysis. Thus, in the "bag-of-words" approach, the tokens of the sentence 202 include representations of the following words: "are" (or lemma "be"), "you", "sure", "said" (or lemma "say"), "rabbit," "still," "more," and "surprised."

The tokens can be converted into token sequences or token groupings in a method referred to generally as producing n-grams. Taking an integer n as representing the "bag of words" number of simple (singular) tokens, the n tokens, in some embodiments, are converted into sequences. For example, for n=2 (bi-grams), the bi-gram tokens for the sentence 202 include ["are", "you"], ["you", "sure"], ["sure", "said"], etc. In some embodiments, the token groupings are non-sequential, referred to as skip-grams, where the n-gram tokens are formed by skipping a prescribed number of intermediate words between words of the text (e.g., sentence 202). In an example, a skip-gram form of bi-grams may be produced by skipping every other word (e.g., ["are", "sure" ], ["you", "said"], ["sure", "Rabbit"], etc.).

The classical n-grams presented in the examples above can be represented as vectors. For example, if an n-gram is a sequence of words $w^1, w^2, \ldots w^n$ this n-gram is represented by a concatenated vector $v=[V(w^1), V(w^2), \ldots v(w^n)]$. As demonstrated, n-grams give insight into the grammatical structure of the sentence. However, the classical n-grams rely on the word order. Even with perfect grammar, nearby words are not necessarily the ones with a direct grammatical relation. Further, the set of word groupings in the n-gram tokens change with variations in sentence structure. In illustration, the sentence 202 could be structured differently but with the same meaning by writing it as "The Rabbit, still more surprised, said: 'Are you sure?'."

Thus, rather than or in addition to applying classical n-grams to analyze responses, the analysis, in some implementations, includes n-grams developed using a parsing tree format, such as the parsing tree 200 illustrated in FIG. 2, rather than using the word order of the sentence 202. The inventors refer to this style of tokenization format as "syntactic n-grams." A syntactic n-gram is represented by a token formed by any two vertices of G connected with an edge. The dependence type between simple tokens of the syntactic n-gram is included as part of the syntactic n-gram. For example, sentence 202 includes the following syntactic bi-gram tokens: ["are"nsubj"you"], ["are"acomp"sure"], ["said"ccomp"are"], etc. Further, a syntactic 3-gram can be formed of any subgraph that consists of three vertices with a path connecting them, such as ["rabbit"amod"surprised"advmod"still"]. Similarly, higher-order n-grams, such as 4-gram and 5-gram, can be built using this general subgraph format.

In addition to producing more descriptive tokens (syntactic n-gram tokens) from a text, the parsing tree format provides other insights into the structure of the locution. Graph metrics may be derived from the parsing tree format and included as part of textual analysis. The graph metrics, in some examples, may include a number of leaves (i.e., vertices with no outgoing edge), an average number of outgoing edges per vertex (branching), and a tree height (length of the longest path). Additional, more involved, metrics may be derived from graph theory and used as variables for analysis as well.

Returning to FIG. 1A, in some embodiments, the answer vectorization engine 114, in formatting the free-form answers into the vector format(s), may adjust the received text for consistency, such as consistency in spelling (e.g., misspelling correction, conversion of British/American spellings to single style, etc.), verb tense, and/or formatting of numerals (e.g., written language v. integer form), to allow for recognition by trained machine learning models. The answer vectorization engine 114, further, may remove portions of the answer, such as punctuation and/or determinatives (e.g., "the," "this," etc.). The answer vectorization engine 114 may provide the vector format(s) of the free-form answers to an automated evaluation engine 116a for content evaluation. In some embodiments, the answer vectorization engine 114 stores the vector format(s) of the free-form answers to a non-transitory storage region as vectorized answers 148.

In some implementations, an answer metrics engine 130 calculates a set of answer metrics 152 related to the vectorized answer 148 generated by the answer vectorization engine 114. The answer metrics 152 may correspond to one or more forms of vectorized answer, in the event that the answer vectorization engine 114 stored multiple formats of the free form answer for automated evaluation. Examples of metrics are provided in relation to a method 320a of FIG. 4A.

In some implementations, an automated evaluation engine 116a applies trained machine learning models 108 to evaluating the vectorized answers 148 generated by the answer vectorization engine 114. At least a portion of the vectorized answers 148 may be evaluated in view of the answer metrics 152 calculated by the answer metrics engine 130.

The automated evaluation engine 116a, in some embodiments, applies one or more machine learning models 108 to one or more syntactic N-gram forms of the vectorized answer on a section-by-section basis to evaluate the content of the given section. In evaluating the section content using syntactic N-gram form, for example, the sentences provided by the student in relation to the particular section can be analyzed in view of the goal or purpose of each section (e.g., claim, evidence, or reasoning, etc.) to automatically evaluate the section content in light of the thrust of its text, rather than simply focusing on the correctness of the answer and/or the stylistic correctness of the drafting (e.g., spelling, grammar, etc.). The portion of the machine learning models 108 directed to evaluating each section, for example, may be trained (e.g., by a machine learning model training engine 126), on a section type by section type basis, using a portion of a set of historic graded answers 140 having a scoring breakdown including one or more section content scores.

The automated evaluation engine 116a, in some embodiments, applies one or more machine learning models 108 to one or more syntactic N-gram forms of the vectorized answer as a complete set of sections to evaluate the logical connections between the sections of the freeform answer. The portion of the machine learning models 108 directed to evaluating logical connections, for example, may be trained (e.g., by the machine learning model training engine 126) using a portion of the set of historic scored answers 140 having a scoring breakdown including at least one logical connections score.

In some embodiments, the automated evaluation engine 116a applies one or more machine learning ("ML") models 108 to one or more classic N-gram forms of the vectorized answer to evaluate the stylistic and/or grammatical quality of the content of the freeform answer. The portion of the machine learning models 108 directed to evaluating the stylistic and/or grammatical quality of the content, for example, may be trained (e.g., by the machine learning model training engine 126) using a portion of the set of historic scored answers 140 having a scoring breakdown including a stylistic and/or grammar score.

In some embodiments, the automated evaluation engine 116a evaluates at least a portion of the vectorized answers 148 in view of one or more evaluation rules 154. The evaluation rules 154, in some examples, may relate to a type of subject matter, the learning level of the student (e.g., based on student demographics 144), and/or the particular question being answered. In one example, younger students and/or students at a lower learning level may be evaluated based on less stringent evaluation rules 154 (e.g., content and logical flow, but not stylistic and grammar analysis) while older students and/or students at a higher learning level may be evaluated based on more stringent evaluation rules 154. The evaluation rules 154, in some embodiments, may be used by the answer vectorization engine 114 to generate vectors appropriate to the particular level of analysis (e.g., classic n-grams versus no classic n-grams analysis) being applied by the automated evaluation engine 116a. The output of the ML models 108, in some embodiments, is stored as ML analysis results 156.

In some implementations, a score calculating engine 118 obtains the ML analysis results 156 output from the trained machine learning models 108 and scores the student's answers. The score calculating engine 118 may generate one or more scores such as, in some examples, an overall score, a content score for each section representing a match between the desired thrust of the particular section and the text provided by the learner, at least one topic correctness score representing whether the text provided by the learner contains a correct answer and/or an on-topic answer, a logical connection score representing logical flow between sections of the freeform answer, and/or a style and grammar score. The scores, in some examples, may include a graded score (e.g., A+ to F), a percentage score (e.g., 0% to 100%), and/or a relative achievement rating (e.g., excellent, satisfactory, unsatisfactory, incomplete, etc.). In some embodiments, the score calculating engine 118 calculates one or more scores based on automated scoring rules 142. The automated scoring rules 142, for example may include weights to be applied in combining the outputs of the trained machine learning models 108, types of outputs to combine to generate each type of score of the one or more scores generated for each answer, and/or rules for normalizing or adjusting the score based upon group performance and/or anticipated group performance (e.g., grading on a scale). The score calculating engine 118 may supply the score(s) to the student GUI engine 112 to present results to the student and/or a teacher GUI engine 128 to present results to the student's teacher. In another example, the score calculating engine 118 may provide the score(s) to a learning resource recommendation engine 134 for recommending next learning materials.

In some implementations, depending on the score, the freeform answer may be presented for manual scoring. Manual scoring rules 146, for example, may be applied to the score(s) calculated by the score calculating engine 118, and scores above an upper threshold and/or below a lower threshold may be submitted for manual double-checking. A manual scoring GUI engine 122, for example, may present the student freeform answer to a teacher or other learning professional for manual evaluation and scoring. The manually scored answer, further, may be provided to the machine learning model training engine 126 as an additional example of a very good (or very bad) example of a student freeform answer for use in updating one or more of the trained ML models 108.

In some implementations, a portion of the scores generated by the score calculating engine 118 are used by a learning resource recommendation engine 134 for determining the next learning materials to present to a student. Based on a student's proficiency in a topic as demonstrated through the freeform answer, for example, the learning resource recommendation engine 134 may recommend moving onto a deeper analysis of the topic or moving onto a new topic. Conversely, based on a lack of student proficiency in a topic as demonstrated through the freeform answer, the learning resource recommendation engine 134 may propose one or more learning resources meant to reinforce understanding of the present topic. The learning resources recommended, in some examples, may include learning resources not yet seen by the student, learning resources the student spent little time on, and/or learning resources in forms preferred by the student.

In some implementations, a student clustering engine 120 analyzes student scores for freeform answers and/or other interactions with the learning platform to cluster groups of students by ability. The student clustering engine 120, for example, may generate student groupings based on a set of student clustering rules 150. The student clustering rules, in some examples, may identify a total number of groupings, a score or level cut-off for each grouping, and/or a learning level/proficiency level associated with each grouping. In an illustrative example, the student clustering engine 120, based at least in part on scores generated by the score calculating engine 118 in relation to one or more freeform answers submitted by each student of a student population, may cluster the student population into a set of advanced students, a set of proficient students, and a set of novice students in relation to a particular subject and/or learning topic area. The student clusters may be used, in some examples, to generate comparison metrics between student populations (e.g., different schools, different geographic regions, etc.), provide a general evaluation of class performance to a teacher (e.g., via the teacher GUI engine 128), and/or provide further input to the learning resource recommendation engine 134 regarding appropriate materials to present to different groupings of students.

In some implementations, the machine learning model training engine 126 trains one or more machine learning models to analyze each form of various forms of vectorized freeform answers, including at least one syntactic N-gram form, generated by the vectorization engine 114 to automatically evaluate at least the quality of the subject content of the freeform answers. The machine learning model training engine 126, for example, may obtain a set of historic scored answers 140 from the storage region 110a for analysis. The historic scored answers 140, in some embodiments, embody a variety of subject areas, student levels (e.g., age, grade, and/or proficiency), and scoring results. A portion of the historic scored answers 140, in some embodiments, were manually scored (e.g., via the manual scoring GUI engine 122) by subject matter experts or other professionals trained in applying scoring rubrics including at least one rubric associated with a multi-section format used with each of the historic scored answers. In some embodiments, a portion of the historic scored answers 140 are example answers generated by subject matter experts or other professionals trained in the appropriate scoring rubrics as excellent freeform answers. In training the ML models 108, the ML model training engine 126 may incorporate one or more answer metrics relevant to the particular vectorized form of freeform answer, such as the answer metrics 152 generated by the answer metrics engine 130. The ML model training engine 126 may store the trained ML models 108 for use by the automated evaluation engine 116a.

Figure 1B:
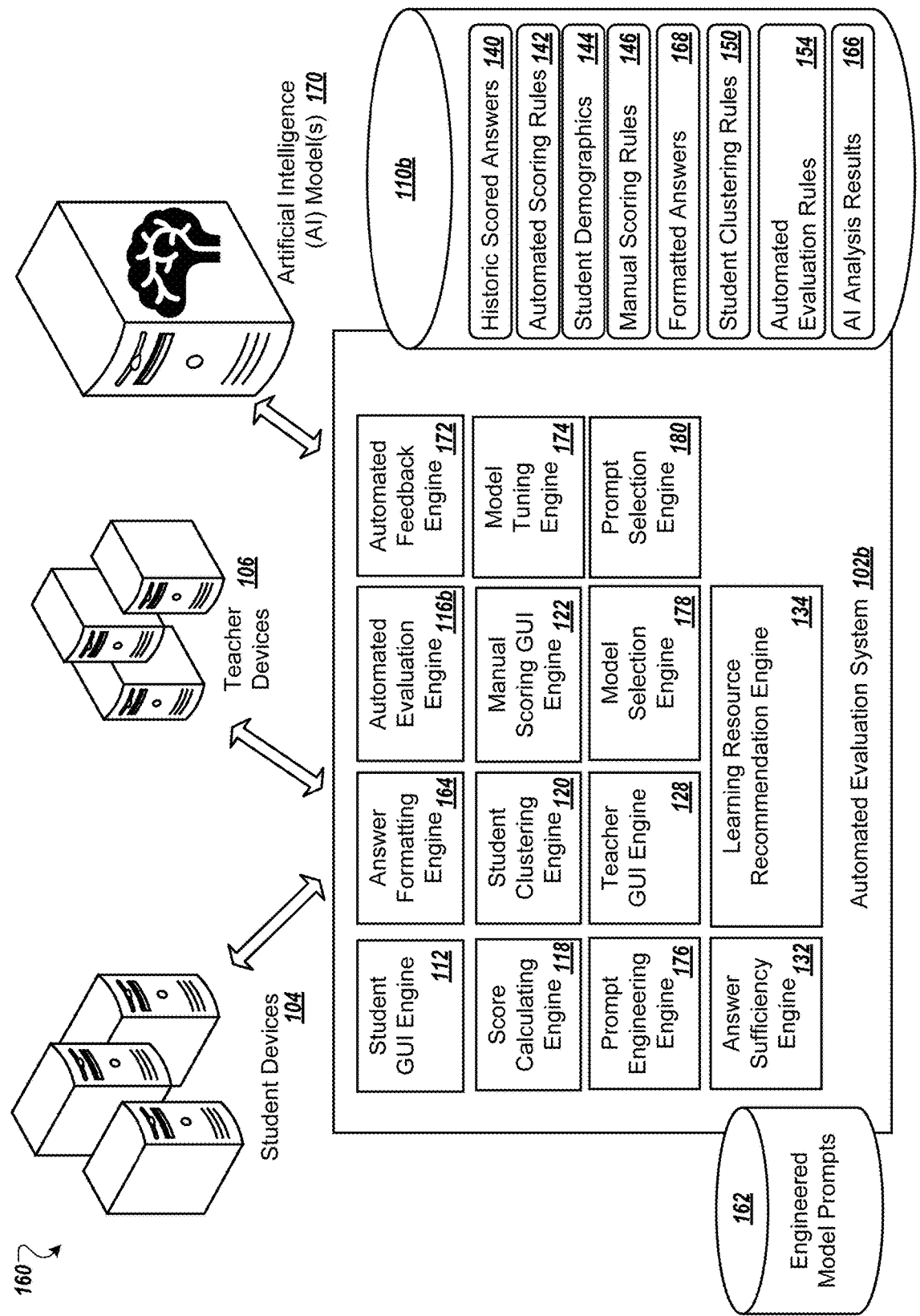

Turning to FIG. 1B, a block diagram of an example platform 160 includes an automated evaluation system 102b, similar to the automated evaluation system 102a of FIG. 1A, for automatically evaluating free-form answers to multi-dimensional reasoning questions. Unlike the platform 100 of FIG. 1A, the automated evaluation system 102b is in communication with one or more artificial intelligence (AI) models 170 (e.g., neural network models) for performing automated evaluation of freeform answers submitted via the student devices 104. The AI model(s) 170, for example, may include foundational models, such as large language models (LLMs). Certain foundational models of the AI model(s) 170, further to the example, may be fine-tuned for particular review tasks required by the automated evaluation system 102b. Certain AI model(s) 170, such as foundational models, may be provided by third party systems.

In some implementations, to evaluate the freeform answers using the AI model(s) 170, at least portions of the freeform answers may be formatted using an answer formatting engine 164. The answer formatting engine 164, for example, may tokenize each section of the freeform answer. The answer formatting engine 164, in another example, may adjust the received text for consistency, such as consistency in spelling (e.g., misspelling correction, conversion of British/American spellings to single style, etc.), verb tense, and/or formatting of numerals (e.g., written language v. integer form), to allow for consistent treatment by the AI model(s) 170. The answer formatting engine 164, in a further example, may remove portions of the answer, such as certain punctuation and/or special characters. The formatted answer, for example, may be stored as formatted answer(s) 168.

The formatting, in some implementations, depends in part upon a type of AI model 170 used for the particular answer. For example, a model selection engine 178 may select a particular AI model 170 for use with the student freeform answer based on student demographics 144 and/or context of the student answer. The context, in some examples, can include a topic, a level, a style of question, and/or a scoring rubric (e.g., automated scoring rules 142) applicable to the student freeform answer.

In some implementations, the formatted answer(s) 168 are provided by the automated evaluation engine 116b to one or more of the AI models 170. The automated evaluation engine 116b may communicate via engineered model prompts 162 with the AI model(s) 170 to instruct the AI model(s) 170 on analyzing the formatted answer(s) 168. The automated evaluation engine 116b, for example, may provide engineered model prompts 162 corresponding to desired scoring rules 142, evaluation rules 154, and/or other scoring and/or evaluation rubrics. Further, the automated evaluation engine 116b may provide engineered modeling prompts 162 corresponding to particular student demographics 144, such as, in some examples, student age, student grade level, and/or student skill level.

In some implementations, a particular set of engineered model prompts 162 are selected by a prompt selection engine 180 for requesting evaluation of the freeform student answer (or formatted version thereof) from one of the AI models 170. The prompt selection engine 180, for example, may match student demographics 144, automated scoring rules 142, and/or automated evaluation rules 154 with certain engineered model prompts 162 to obtain an evaluation aligning with the context of the student answer.

The engineered model prompts 162, in some embodiments, are generated at least in part by a prompt engineering engine 176. The prompt engineering engine 176, for example, may iteratively adjust prompt language to predictably achieve automated scores aligning with manual scores using a set of pre-scored training examples (e.g., the historic scored answers 140). In an illustrative example, the prompt engineering engine may insert pre-scored training examples into the prompt for scoring guidance.

In some embodiments, the automated evaluation engine 116b selects certain AI model(s) 170 for performing the evaluation. The selection, in some examples, may be based at least in part on training of particular AI model(s) 170 and/or fine-tuning of the particular AI model(s) 170. Certain AI model(s) 170, for example, may be trained and/or fine-tuned such that those AI model(s) are adapted to evaluating freeform answers and/or the formatted answers 168 according to desired scoring and/or evaluation rubrics. In other examples, certain AI model(s) 170 may be trained and/or fine-tuned for evaluating at different competency levels (e.g., skill levels, grade levels, etc.), in different languages, and/or in view of different subject areas (e.g., science, history, etc.).

Certain foundational AI model(s) 170, in some embodiments, are fine-tuned using a model tuning engine 174 for performing evaluations of freeform answers. The model tuning engine 174, for example, may supply the historic scored answers 140 to certain foundational AI model(s) 170 to adjust the training of the foundational model for analyzing the style of freeform answers students submit to the automated evaluation system 102b (e.g., as described, for example, in relation to FIG. 8A).

In some implementations, the automated evaluation engine 116b receives artificial intelligence (AI) analysis results 166 from the selected AI model(s) 170 including at least one score. The at least one score, for example, may be provided in a format designated by the automated scoring rules 142 (described in relation to FIG. 1A). A portion of the AI analysis results 166, in some embodiments, include text-based feedback regarding the reasoning behind the automated score generated by the selected AI model(s). The feedback portion, in some examples, may include hints, suggestions, pointers to specific parts of a student's response without revealing the actual correct/desired answer, and/or step-by-step explanations regarding the teachings behind the answer. The feedback portion, for example, may be provided by to the automated feedback engine 172 for presenting feedback to the student and/or instructor (e.g., via the student devices 104 and/or teacher devices 106). Feedback to the student, for example, may include actionable suggestions and/or hints for improving the final score for the freeform answer.

Figure 3:
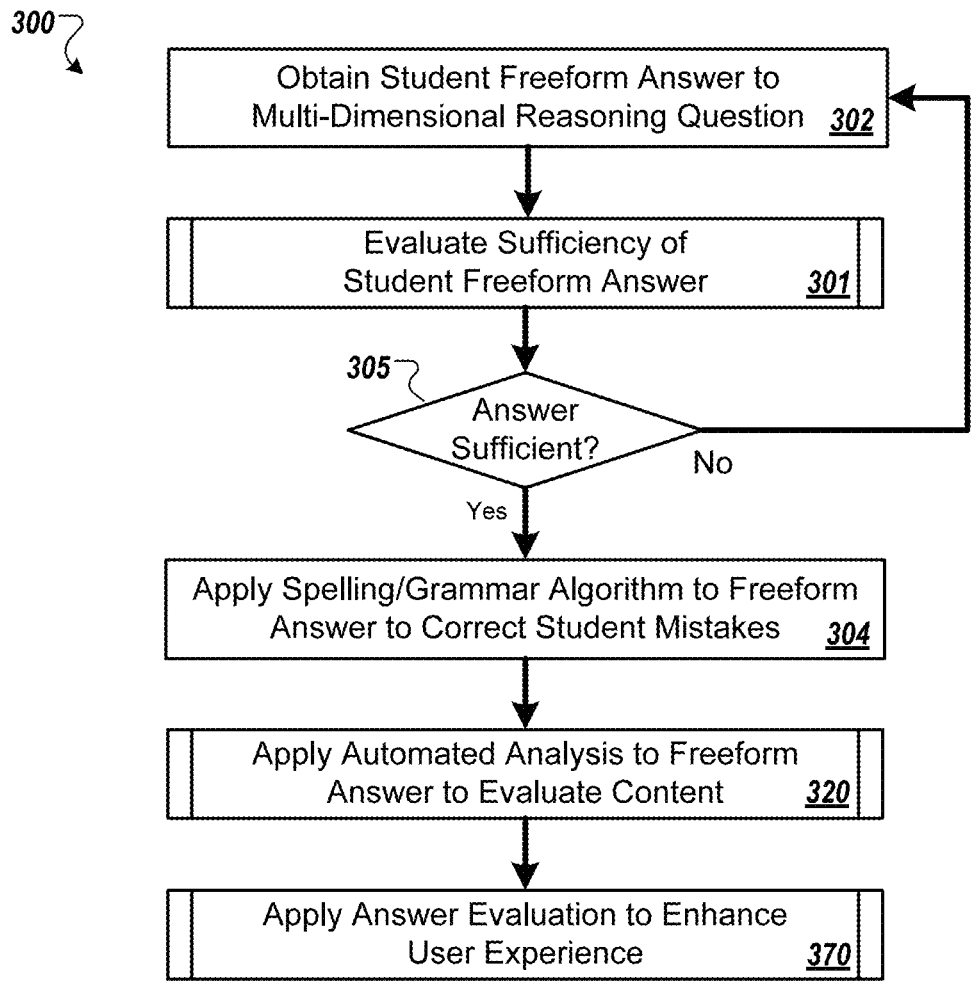
FIG. 3, FIG. 4A, FIG. 4B, FIG. 4C, FIG. 5A, FIG. 5B, FIG. 6, FIG. 7A, and FIG. 7B illustrate flow charts of example methods for automatically evaluating free-form answers to multi-dimensional reasoning questions.

FIG. 3 illustrates a flow chart of an example method 300 for automatically evaluating free-form answers to multi-dimensional reasoning questions. Portions of the method 300, for example, may be performed by the answer vectorization engine 114 and/or one of the automated evaluation engine 116a of FIG. 1A or the automated evaluation engine 116b of FIG. 1B.

In some implementations, the method 300 begins with obtaining a freeform answer to a multi-dimensional reasoning question submitted by a student (302). The freeform answer, for example, may include one or more sentences. In some embodiments, the freeform answer is formatted in a particular structure, such as a claim, evidence, reasoning (CER) framework or a claim, evidence, reasoning, closure (CERC) framework based on the scientific method, the restate, explain, examples (REX) model for answering short answer questions, the introduction, body, conclusion framework, the answer, prove, explain (APE) framework, and/or the topic sentence, concrete detail, commentary, closing/concluding sentence (TS/CD/CM/CS) framework. The freeform answer may be obtained electronically from an answer submission form presented to the student.

Figure 6:
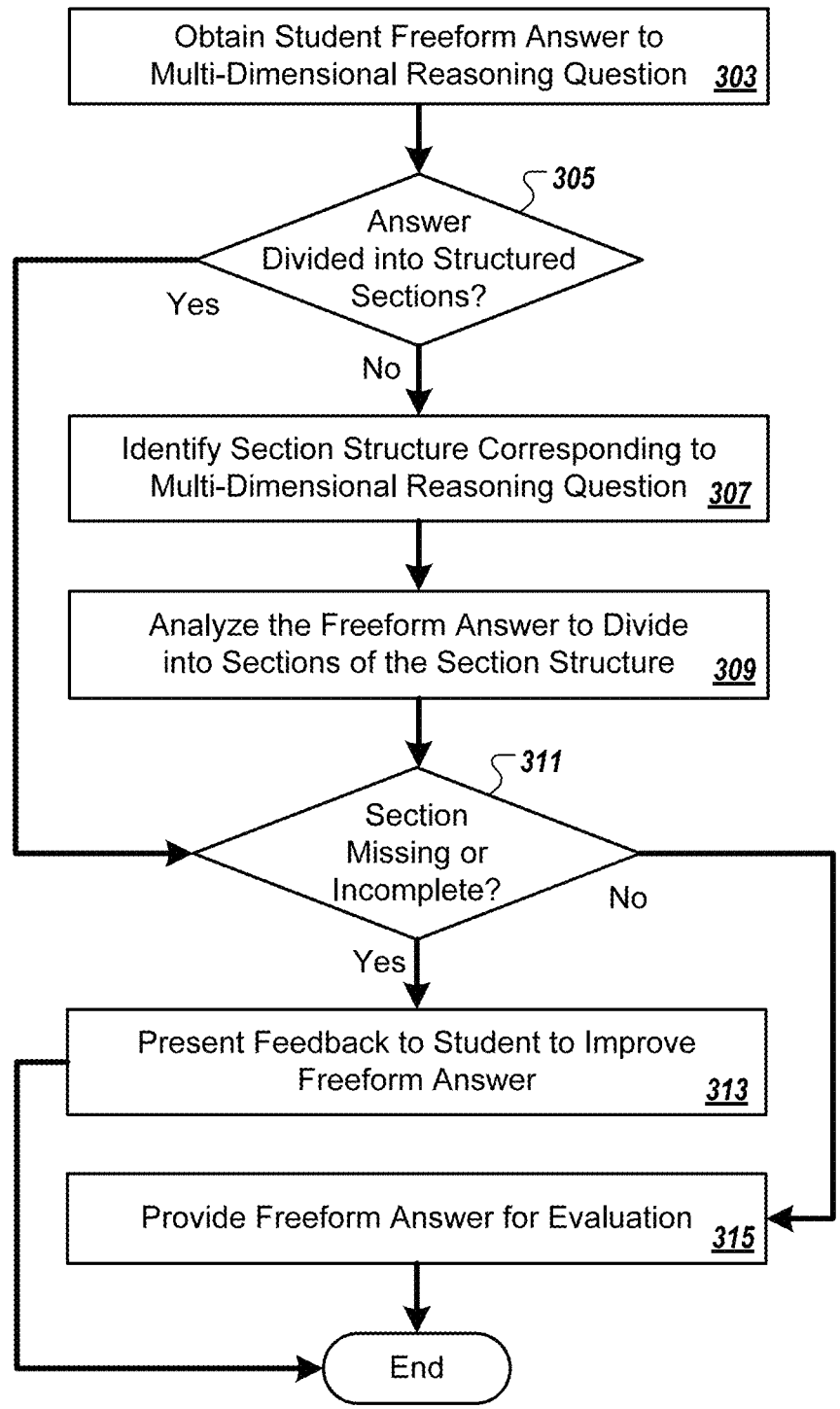

In some implementations, the sufficiency of the student freeform answer is evaluated (301). The evaluation, for example, may be performed by the answer sufficiency engine 132. Turning to a method 301 of FIG. 6, in some implementations, a student freeform answer to a multidimensional reasoning question is obtained (303). The answer may be obtained, for example, from the method 300 of FIG. 3.

In some implementations, if the freeform answer is not already divided into structured sections (305), the section structure corresponding to the multi-dimensional reasoning question is identified (307). As described previously, the sections may be structured in a variety of formats, such as the CER format for scientific method style answers or the introduction, body, conclusion standard framework.

In some embodiments, the answer is submitted in a graphical user interface having text entry fields separated by section of the structured format. For example, turning to FIG. 8A, a first example screenshot 400 of a graphical user interface presented on a display 404 of a device 410 includes a set of text entry fields 402 separated into a claim text entry field 402a, an evidence text entry field 402b, and a reasoning text entry field 402c. A student may prepare a freeform answer by entering text into the text entry fields 402. Upon completion of the answer, the student may select a submit control 406 to submit the contents of the text entry fields 402 as an answer prepared in the CER structure format.

Returning to FIG. 6, if the answer has not been received in a form that is already divided into structured sections (305), in some implementations, a section structure is identified corresponding to the multi-dimensional reasoning question (307). In some examples, information associated with the freeform answer itself, the student who submitted the freeform answer, and/or the learning unit associated with the question being answered in the freeform answer may be analyzed to identify a particular structured format to apply. In one example, the question associated with the freeform answer may be associated with a particular type of structured format. In another example, a learning level and/or age of the student (e.g., based on the student demographics 144 of FIG. 1A and FIG. 1B) may be associated with a particular type of structured format. In a third example, a topic area (e.g., history, science, literature, geography, etc.) may be associated with a particular type of structured format.

In some implementations, the freeform answer is analyzed using the identified section structure to automatically divide the answer into the sections of the section structure (309).

Figure 8A:
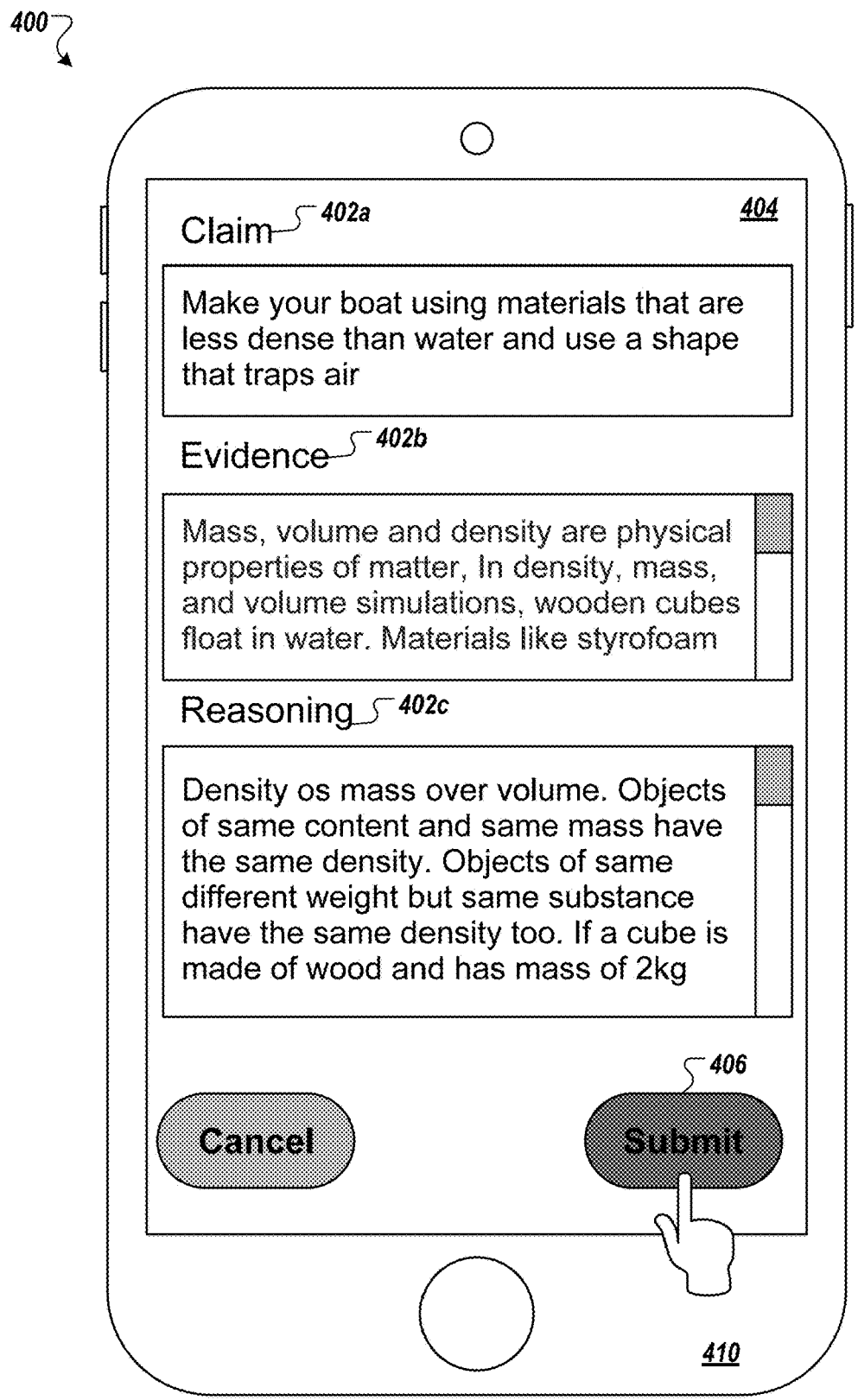
FIG. 8A and FIG. 8B illustrate screen shots of example user interface screens for entering text responses to multi-dimensional reasoning questions.

In some implementations, if a section of the freeform answer is missing or incomplete (311), feedback is presented to the student to improve the freeform answer (313). Each section, for example, may be reviewed for containing some text. Further, each section may be reviewed for spelling and/or grammar (e.g., the final sentence in the evidence section 402b of FIG. 8A is a sentence fragment with no punctuation). In some embodiments, each section is reviewed to confirm it contains language representative of the section (e.g., the sentence in the claim 402a section should contain a claim rather than a directive as illustrated in FIG. 8A).

Figure 8B:
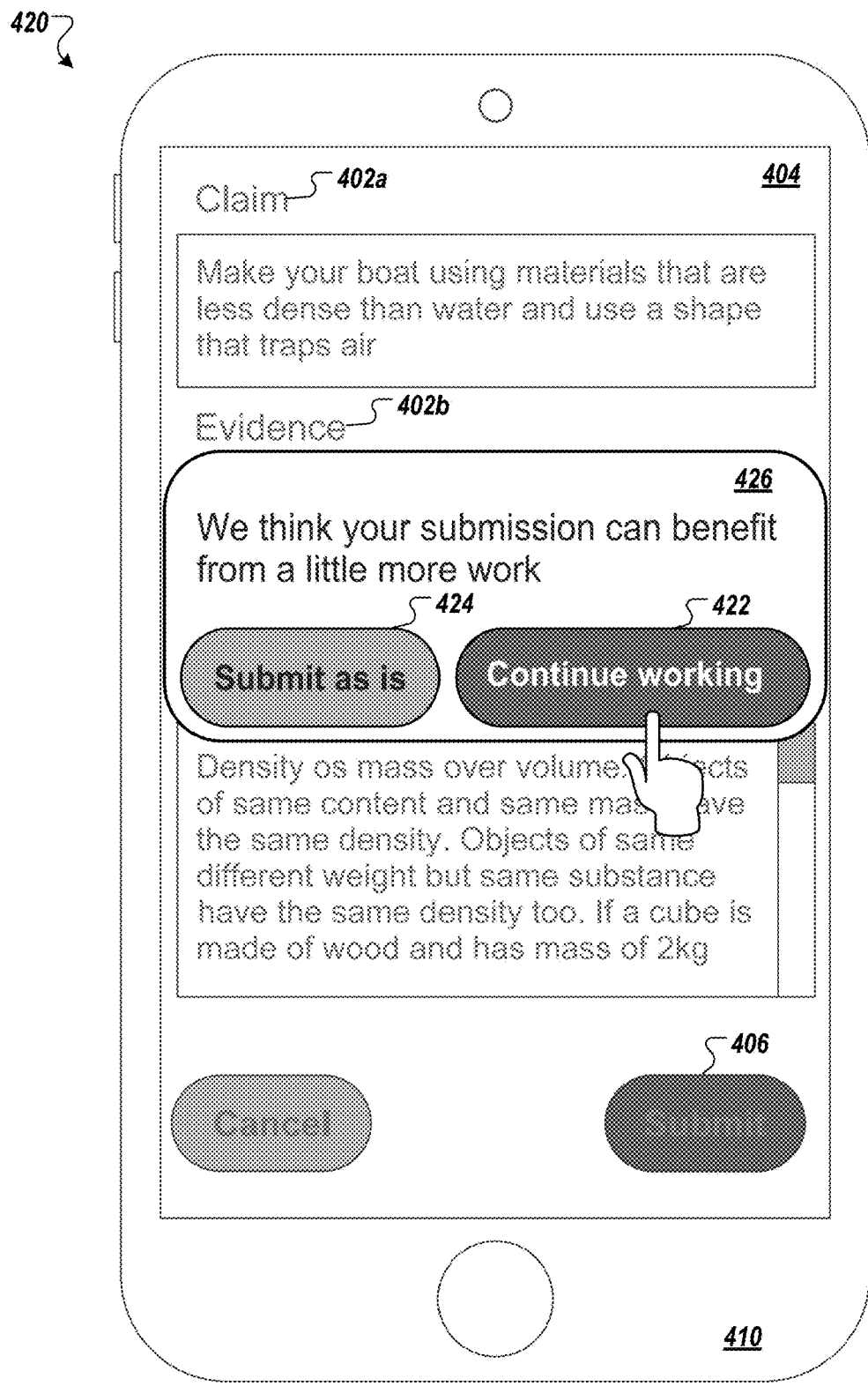

In some embodiments, turning to FIG. 8B, general feedback is presented to the user, providing the student the opportunity to continue developing the freeform answer. As illustrated, a pop-up window 426 overlaying the graphical user interface 404 reads "We think your submission can benefit from a little more work." The student is offered two control options: a "submit as is" button 424 that, when selected, continues submission of the freeform answer for evaluation, and a "continue working" button 422 that, when selected, returns the student to the graphical user interface 404 to continue work on one or more sections 402 of the freeform answer. In other embodiments, the student may be directed to a particular section (e.g., identification of a section containing no text or, as illustrated in claim section 402a, a single sentence with no punctuation).

Returning to FIG. 6, in some embodiments, if the analysis did not identify any missing and/or incomplete sections (311), the freeform answer is provided for evaluation (315). The evaluation, for example, may be conducted by the automated evaluation engine 116a of FIG. 1A or the automated evaluation engine 116b of FIG. 1B.

Although presented as a particular series of operations, in other embodiments, the method 301 includes more or fewer operations. For example, in some embodiments, the freeform answer is further analyzed in relation to spelling and/or grammar. In some embodiments, certain operations of the method 301 are performed concurrently and/or in a different order. For example, prior to analyzing the freeform answer to divide into sections (309), a sufficiency of length, usage of punctuation at the end of the submission (e.g., to double check whether the student inadvertently selected submit during drafting), or other analysis of the freeform answer may be performed and feedback presented to the student (313) in relation to the perceived insufficiency of the answer. In some embodiments, at least a portion of the method 301 is performed by one or more AI models. For example, presenting feedback to the student (313) may be performed through prompt engineering to devise actionable advice on how to improve sufficiency of the response. Other modifications of the method 301 are possible.

Returning to FIG. 3, in some implementations, if the answer has been determined to be insufficient (305), the student is provided the opportunity to continue working on the answer, and the method 300 returns to waiting to obtain the updated answer (302).

In some implementations, if the freeform answer is determined to be sufficient (305), a spelling and/or grammar checking algorithm is applied to the freeform answer to correct student mistakes and conform the answer to a standardized format (304). Misspelled words may be corrected. Words having multiple alternative spellings (e.g., canceled/cancelled) may be converted to a standard format. The formatting of numerals (e.g., written language v. integer form) may be adjusted to a standard format. In applying the spelling and/or grammar checking algorithm, in some embodiments, the text of the freeform answer is adjusted to more closely match answers used to train machine learning models, such that higher quality results may be obtained from automated machine learning analysis.

In some implementations, automated analysis is applied to the freeform answer to evaluate its content (320). For example, the freeform answer may be evaluated using a method 320a of FIG. 4A through FIG. 4C or a method 320b of FIG. 5A and FIG. 5B.

Figure 4A:
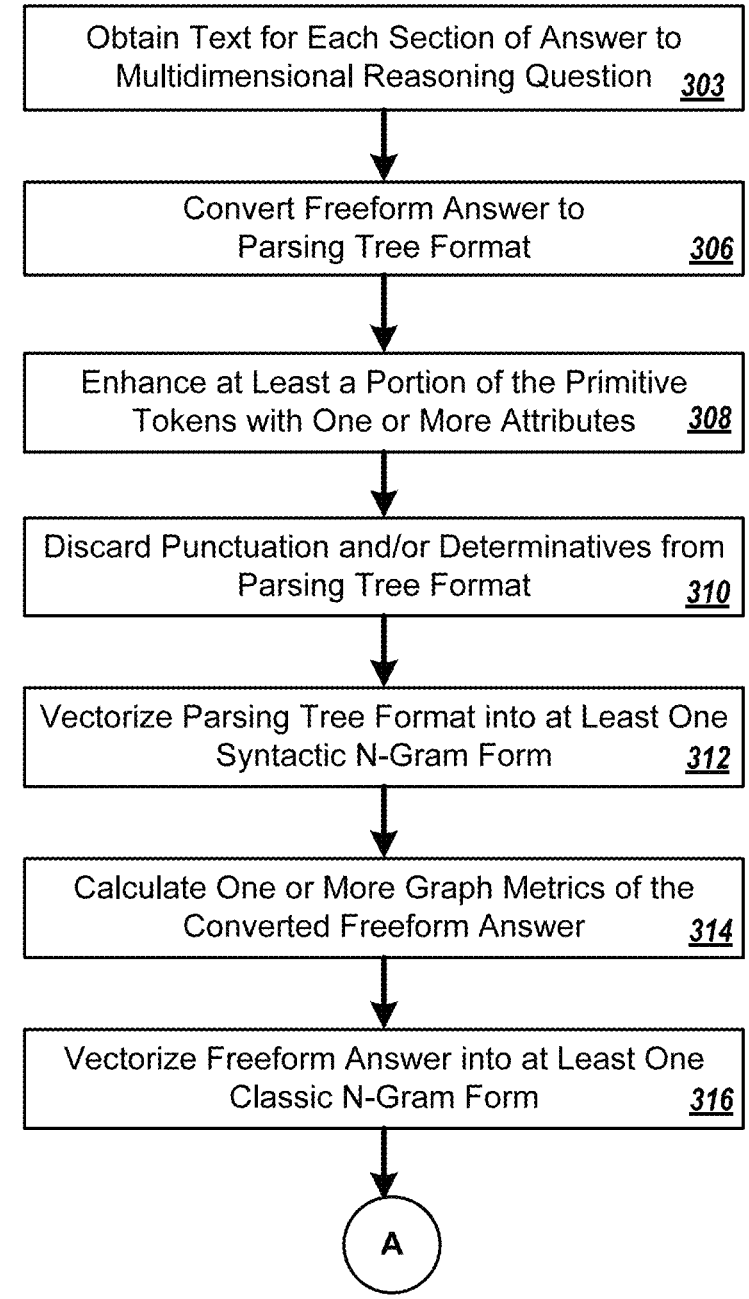

Turning to FIG. 4A, in some implementations, the text for each section of the freeform answer to the multidimensional reasoning question is obtained (303). It may be obtained, for example, from the method 300 of FIG. 3.

In some implementations, the freeform answer is converted to a parsing tree format (306). The conversion, for example, may be performed as described in relation to the answer vectorization engine 114. In some embodiments, a parsing graph G is obtained, where every primitive token (e.g., word, punctuation mark, etc.) is a vertex. If two vertices are connected with an edge, the source vertex may be referred to as the head of the target vertex. Due to the tree formatting of the graph, no vertex will have multiple heads. A vertex without a head is possible—such a vertex may be referred to as a root (e.g., a vertex of in-degree 0). Vertices of out-degree 0 may be referred to as leaves.

In some implementations, at least a portion of the primitive tokens are enhanced with one or more attributes (308). For each edge, an attribute of "dependence type" may be assigned, such as the dependence types 206a-h described in relation to FIG. 2. For each vertex, multiple attributes may be assigned, including, in some examples, the wordform as presented in the text, the lemma of word (e.g., as described in relation to lemmas 208 of FIG. 2), the part of speech of the word (e.g., verb, adjective, adverb, noun, etc., as described in relation to part of speech 210 of FIG. 2), and/or morphological information of the wordform. In example, the primitive token "putting" can be assigned the following attributes: wordform "putting"; lemma "put"; part of speech "verb"; morphological information "aspect: progressive, tense: present, verb form: participle." The attributes may be formatted as a vector.

In some implementations, punctuation and/or determinatives are discarded from the parsing tree format (310). The tree of the parsing graph G can be pruned to remove any vertices including ignorable parts of speech, such as punctuation and determinatives (e.g., words such as "the" or "this"). The edges connected to the pruned vertices are removed as well. Further, in some embodiments, edges having ignorable dependence types may be removed (e.g., dependency "punct," referring to punctuation).

In some implementations, the parsing tree format is vectorized into at least one syntactic n-gram form (312). In some embodiments, the parsing tree format is vectorized into syntactic 2-grams, where each edge of the graph G becomes a new token. A pre-trained vector embedding of English words V(word), for example, may be applied to the source and target vertices of each edge: $V_1$ and $V_2$. An encoding vector $V_1^{(e)}$ may be used for the dependence type of the edge connecting the source and target vertices. Thus, the full vector representation of the new token is a vector formed by concatenating $v=[V_1^{(e)}, V_1, V_2]$. Likewise, in embodiments using other integer value syntactic n-grams instead of or in addition to syntactic 2-grams, a syntactic n-gram of any order n may be represented as $v=[V_1^{(e)}, V_2^{(e)}, \ldots V_{n-1}^{(e)}, V_1, V_2, \ldots V_n]$.

In some embodiments, for computational convenience, the number of tokens in each text is formatted to a same number of tokens (e.g., K tokens). The formatting, in some examples, can be achieved by removing extra vectors and/or padding with null vectors (e.g., vectors of all 0's). When using uniform token numbers, any text may be represented by a matrix of dimensions K×dim v. To determine an order of tokens, for example, the number of ancestors of a syntactic n-gram is set to the number of ancestors of its source-vertex (e.g., the smallest number of ancestors among the vertices of the syntactic n-gram). Further to the example, the syntactic n-grams may be ordered by the number of ancestors, with the ties being broken by the order inherited from the word order in the text to drop excess tokens to format the syntactic n-gram into the uniform matrix.

In some implementations, one or more graph metrics of the converted freeform answer are calculated (314). The one or more graph metrics, for example, may be calculated by the answer metrics engine 130 of FIG. 1A. In some embodiments, the version of the parsing tree format prior to any pruning is used to calculate at least a portion of the metrics. In some examples, a total number of primitive tokens, a number of declarative tokens (e.g., "this," "the"), a number of "stop word" tokens (e.g., "a", "the", "is", "are", etc.), and/or a number of punctuation tokens in the text of the freeform answer may be calculated prior to pruning. In some embodiments, the version of the parsing tree format after any pruning is used to calculate at least a portion of the metrics. In some examples, a number of remaining primitive tokens, a number of noun chunks (e.g., entities in the text), a number of roots (e.g., a number of sentences), a number of leaves, and/or a mean out-degree for a non-leaf vertex may be calculated after pruning is applied to the parsing tree format.

In some implementations, the freeform answer is vectorized into at least one classic n-gram form (316). Classic vectorization is described in relation to FIG. 2.

Figure 4B:
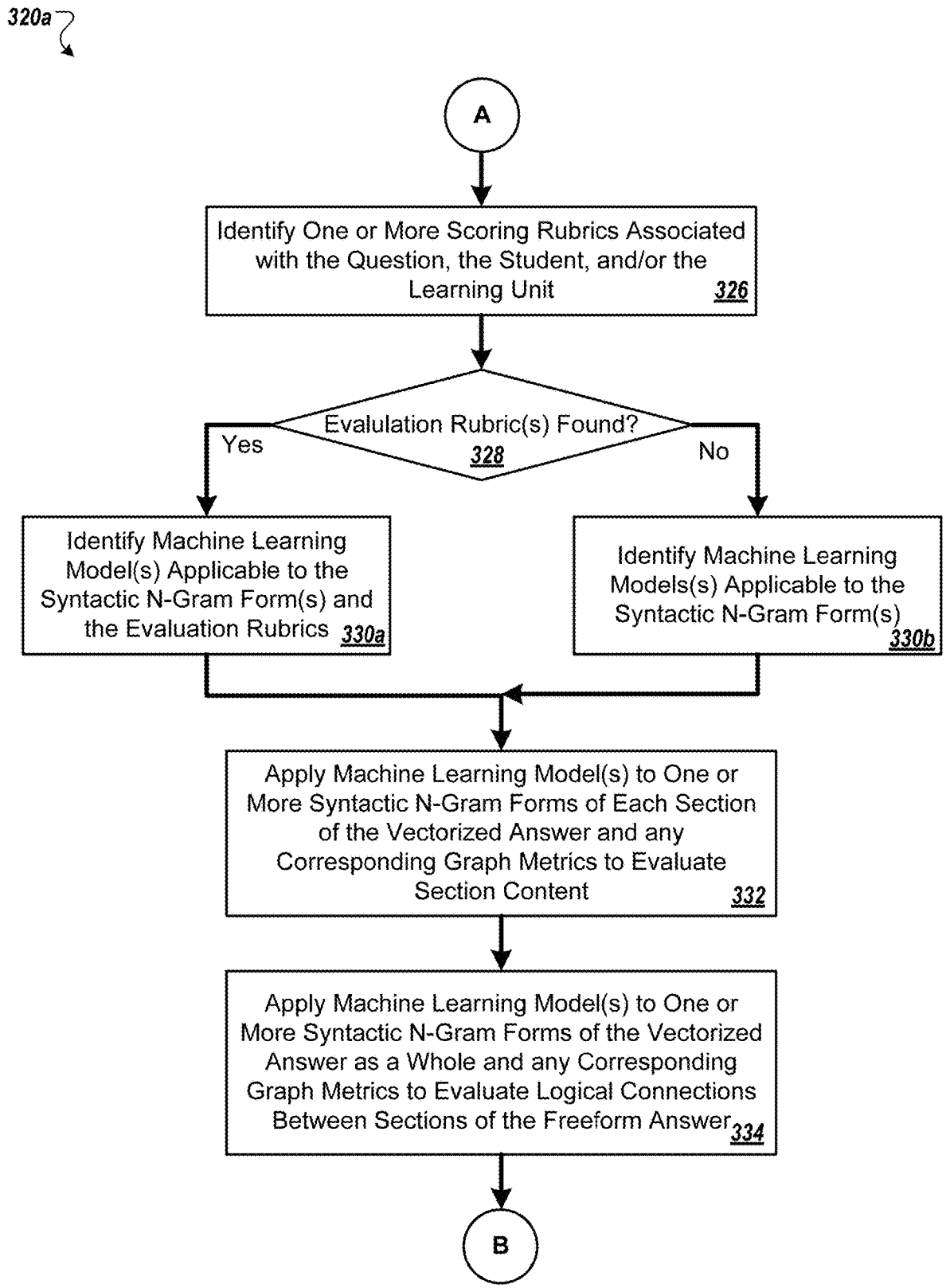

Turning to FIG. 4B, in some implementations, one or more scoring rubrics associated with the question, the student, and/or the learning unit are identified (326). As described in relation to FIG. 1A, for example, the rubrics may be stored as one or more automated evaluation rules 154.

If evaluation rubrics are found (328), in some implementations, one or more machine learning models applicable to the syntactic n-gram form(s) and the scoring rubrics are identified (330a). Otherwise, machine learning model(s) are identified as being applicable to the syntactic n-gram form(s) (330b). The machine learning models may be identified based on further information such as, in some examples, availability of graph metrics used by certain machine learning models, learning unit, question topic, student level, and/or student age.

In some implementations, the machine learning model(s) are applied to one or more syntactic N-gram forms of each section of the vectorized answer and any corresponding graph metrics to evaluate content of the given section of the freeform answer (332). The content of a given section may be evaluated, for example, to determine closeness of the contents of the given section to the goal of the given section. In illustration, turning to FIG. 8A, the text submitted through the claim text entry field 402a may be evaluated for containing language comporting with establishing a claim. Similarly, the text submitted through the evidence text entry field 402b may be evaluated for containing language comporting with establishing evidence, and the text submitted through the reasoning text entry field 402c may be evaluated for containing language comporting with presenting reasoning related to the claim and the evidence.

Returning to FIG. 4B, in some implementations, one or more machine learning models are applied to one or more syntactic N-gram forms of the vectorized answer as a whole, along with any corresponding graph metrics, to evaluate logical connections between sections of the freeform answer (334). The logical connections, for example, may represent a flow in topic and concept presentation between the text of each section of the freeform answer. For example, turning to FIG. 8A, logical connections may include the use of "dense/density" and "materials" between the claim text entry field 402a and the evidence text entry field 402b. Similarly, the logical connections may include the use of "mass," "volume," and "density" between the evidence text entry field 402b and the reasoning text entry field 402c.

Figure 4C:
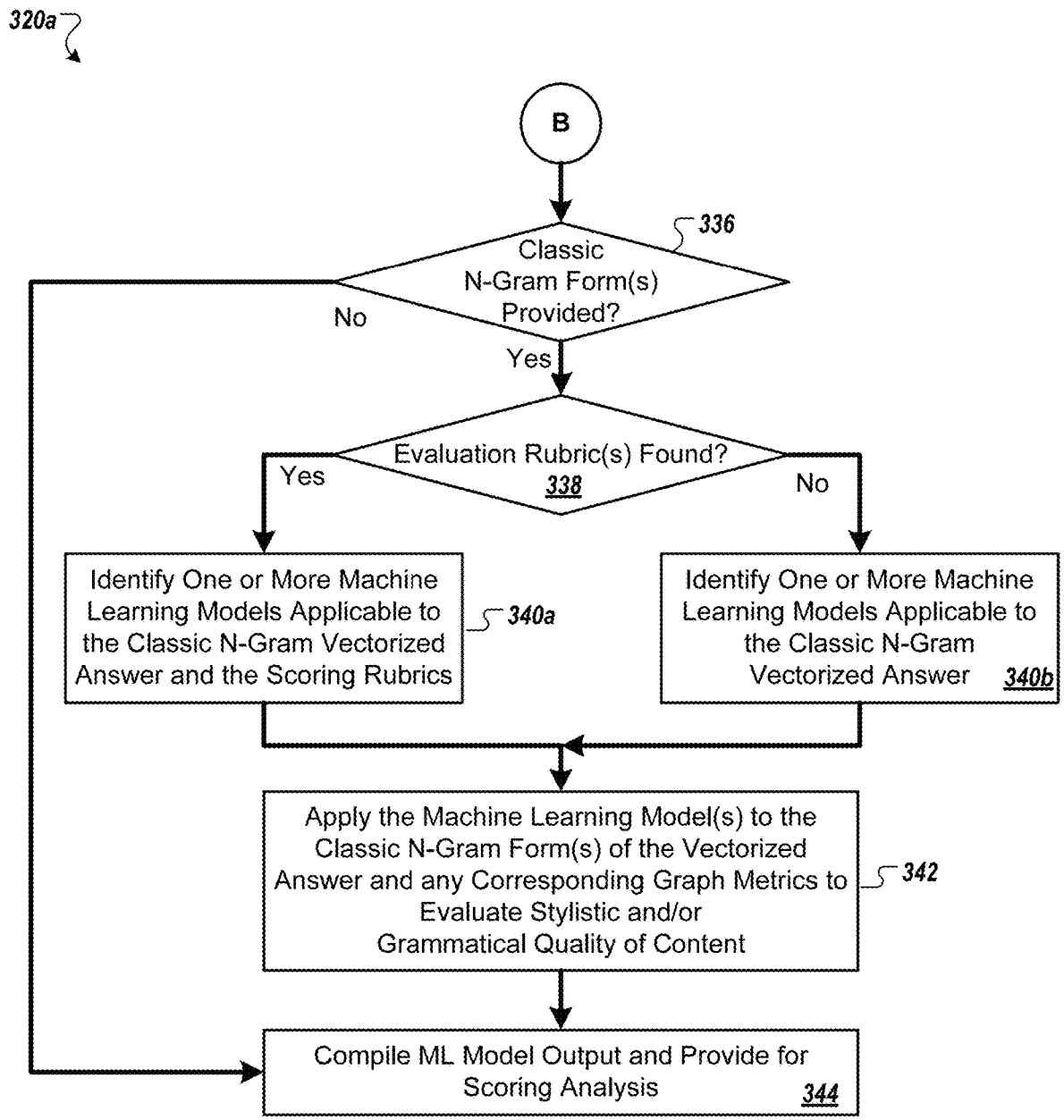

Turning to FIG. 4C, in some implementations where classic N-gram forms have been provided (336), one or more machine learning models applicable to the classic n-gram vectorized answer are identified, either in accordance with scoring rubrics (340a) or without scoring rubrics (340b) depending upon whether evaluation rubrics related to classic N-grams are found (338). As described in relation to FIG. 1A, for example, the rubrics may be stored as one or more automated evaluation rules 154.

In some implementations, one or more machine learning models are applied to the one or more classic N-gram forms of the vectorized answer, along with any corresponding graph metrics relevant to the machine learning model(s), to evaluate stylistic and/or grammatical quality of the content (342). The classic N-grams, for example, may be applied to evaluate the text submitted as the freeform answer in relation to its literary content (e.g., form), as opposed to the syntactic N-gram evaluation described above which targets substance over form. In applying classic N-gram analysis, the method 320a may evaluate more sophisticated learners regarding their writing abilities.

In some implementations, the machine learning model outputs are compiled and provided for scoring analysis (344). The machine learning model outputs may be associated with the learner, the question, the type of structured answer format, the subject matter, the learning unit, and/or other information relevant to converting the machine learning analysis outputs to one or more scores. The machine learning model outputs, for example, may be stored as ML analysis results 156 by the automated evaluation engine 116a of FIG. 1A.

Although presented as a particular series of operations, in other embodiments, the method 320a includes more or fewer operations. For example, in some implementations, rather than or in addition to identifying the machine learning models in accordance to evaluation rubrics, a portion of the machine learning models may be identified in accordance with availability of graph metrics corresponding to the type of trained machine learning model. In another example, the graph metrics may be calculated (314) prior to vectorizing the parsing tree formatting into syntactic n-gram form (312). In some embodiments, certain operations of the method 320a are performed concurrently and/or in a different order. For example, machine learning models may be executed concurrently to evaluate both the syntactic N-gram forms (332, 334) and the classic N-gram forms (342). Other modifications of the method 320a are possible.

Figure 5A:
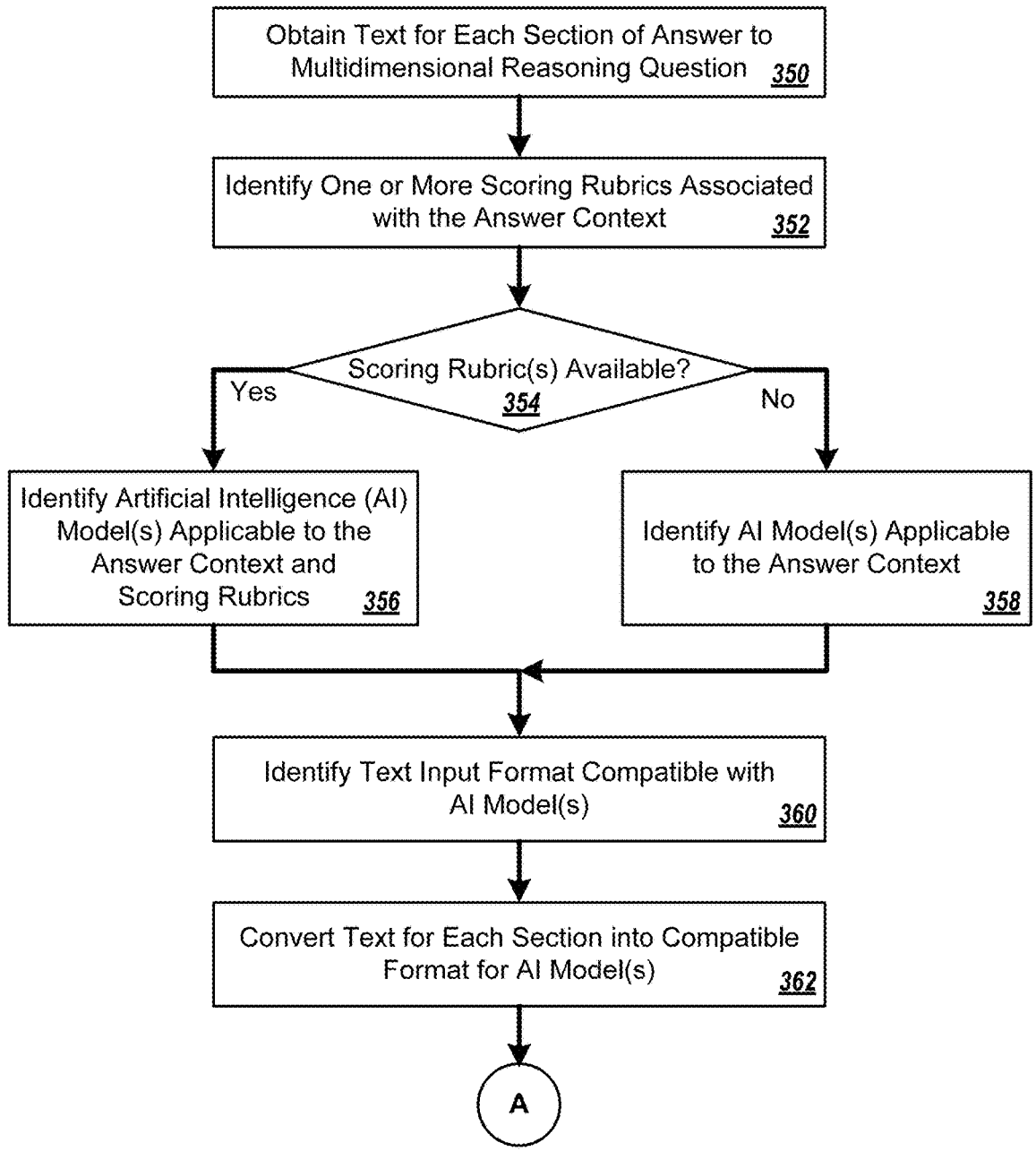
Figure 5B:
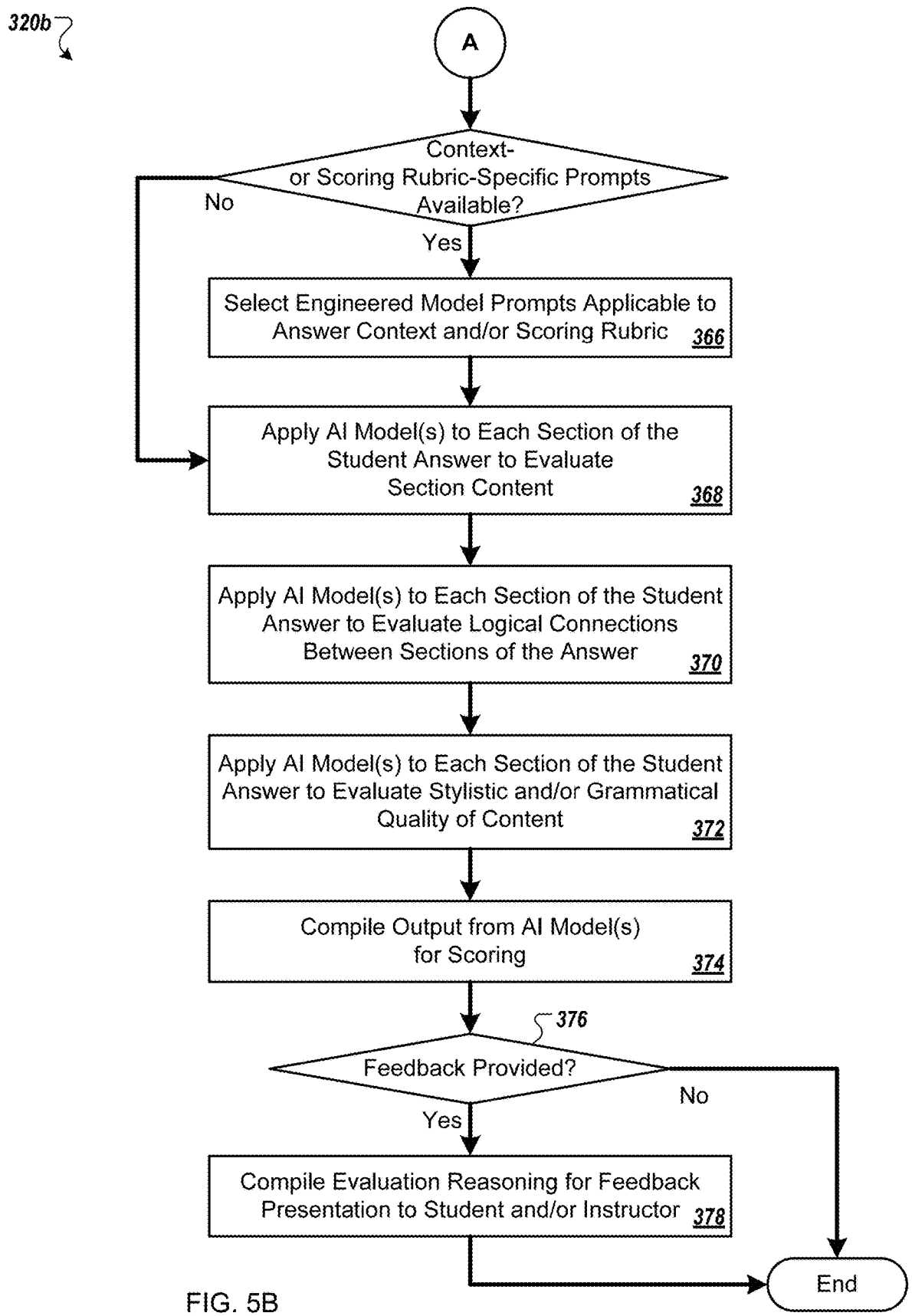

Returning to FIG. 3, in some implementations, automated analysis is applied to the freeform answer to evaluate its content as described by the method 320b of FIG. 5A and FIG. 5B.

Turning to FIG. 5A, in some implementations, text is obtained for each section of the answer to a multi-dimensional reasoning question (350). It may be obtained, for example, from the method 300 of FIG. 3.

In some implementations, one or more scoring rubrics associated with the answer context are identified (352). In some examples, the answer context may include identification of the question, identification of a subject matter of the question, identification of a student and/or student demographic information, and/or identification of a learning unit. The scoring rubrics, for example, may be identified from the automated scoring rules 142 and/or automated evaluation rules 154 of FIG. 1A and FIG. 1B. The scoring rubrics may be identified, for example, by the automated evaluation engine 116a of FIG. 1A or the automated evaluation engine 116b of FIG. 1B.

In some implementations, if one or more scoring rubrics applicable to the answer context are available (354), one or more AI models applicable to the answer context and the scoring rubrics are identified (356). The AI models may be identified, for example, as having been trained or tuned for evaluating answers based on a particular scoring rubric of multiple potential scoring rubrics. The model selection engine 178 of FIG. 1B, for example, may select certain AI model(s) 170 based in part on appropriate automated scoring rules 142 and/or automated evaluation rules 154.

If, instead, there is only one scoring rubric applicable to the system and/or if no particular scoring rubric is identified as being applicable to the answer, in some implementations, one or more AI models applicable to the answer context are identified (358). As with the answer context portion of operation 356, the AI models may be identified, for example, as having been trained or tuned for evaluating answers according to certain contextual factors (e.g., as identified in relation to operation 352).

In some implementations, a text input format compatible with each identified AI model is identified (360). Input formats may differ, for example, across different AI models 170. In this circumstance, formats appropriate for each identified AI model may be identified, for example by the automated evaluation engine 116b or the answer formatting engine 164 of FIG. 1B. The input format, in some examples, can include formats described in relation to the answer formatting engine 164 of FIG. 1B.

In some implementations, the text of each section of the freeform answer is converted into a compatible format for each identified AI model (362). For example, the text may be formatted in one or more of the manners described in relation to the answer formatting engine 164 of FIG. 1B.

Turning to FIG. 5A and FIG. 5B, in some implementations where context-specific and/or scoring-specific engineered model prompts are available for one or more of the identified AI models (362), the engineered model prompts applicable to the answer context and/or scoring rubric are selected (366).

In some implementations, at least one of the selected AI model(s) is applied to each section of the student answer (e.g., original or formatted) to evaluate the section content (368). Applying the selected AI model(s), for example, may include submitting the student answer to each model of the at least one AI model using one or more engineered model prompts. The engineered model prompts, for example, may be appropriate to that particular model and/or the particular task (e.g., evaluation of individual sections). The automated evaluation engine 116b of FIG. 1B, for example, may apply the at least one AI model to each section of the student answer. Applying may include submitting each section to the particular AI model on a section-by-section basis, each section corresponding to a different engineered model prompt.

In some implementations, at least one of the selected AI model(s) is applied to each section of the student answer (e.g., original or formatted) to evaluate logical connections between sections of the student answer (370). Applying the selected AI model(s), for example, may include submitting the student answer to each model of the at least one AI model using one or more engineered model prompts. The engineered model prompts, for example, may be appropriate to that particular model and/or the particular task (e.g., evaluation of logical connections between answer sections). The automated evaluation engine 116b of FIG. 1B, for example, may apply the at least one AI model to the student answer.

In some implementations, at least one of the selected AI model(s) is applied to each section of the student answer (e.g., original or formatted) to evaluate stylistic and/or grammatical quality of the content of the student answer (372). Applying the selected AI model(s), for example, may include submitting the student answer to each model of the at least one AI model using one or more engineered model prompts. The engineered model prompts, for example, may be appropriate to that particular model and/or the particular task (e.g., evaluation of style and/or grammar elements of the student answer). Due to evaluating style and/or grammar, unlike the prior automated evaluations using AI models, the original student answer prior to formatting for spelling and/or grammar correction/consistency may be used for this particular evaluation so that the various typographical errors are identified by the selected AI model(s). The automated evaluation engine 116*b* of FIG. 1B, for example, may apply the at least one AI model to the student answer.

In some implementations, output received from the AI model(s) is compiled for scoring (374). For example, scores from the various evaluation techniques and/or corresponding to each section of the student answer may be compiled for use in generating one or more final scores corresponding to the student answer. The score calculating engine 118, described in relation to FIG. 1A, may obtain the compiled scores from the method 320*b* for use in generating the one or more final scores.

In some implementations, if one or more of the selected AI model(s) provided a feedback portion (376), the evaluation reasoning of the feedback portion is compiled for feedback presentation to the student and/or an instructor (378). The feedback portion(s), for example, may be obtained by the automated feedback engine for converting the feedback into a component of a report or user interface for review by the student and/or instructor.

Returning to FIG. 3, in some implementations, the answer evaluation results are applied to enhance the user experience (370). The user experience may be enhanced, in some examples, through real-time feedback regarding the freeform answer, scoring of the freeform answer, and/or selection of additional learning materials based in part on the evaluation results. Enhancement of the user experience using the evaluation results, for example, is described in greater detail in relation to the method 370 of FIG. 7A and FIG. 7B.

Figure 7A:
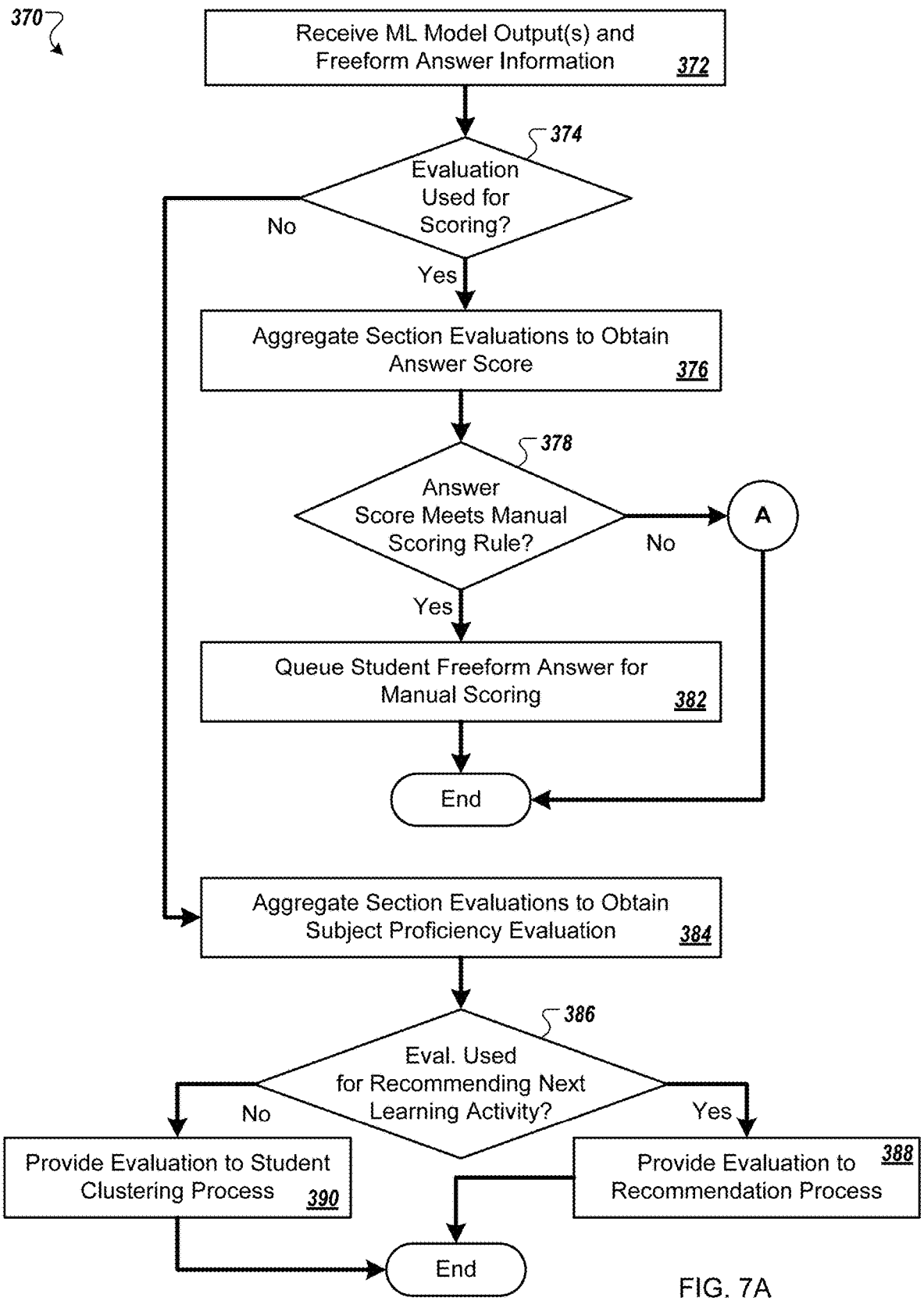
Figure 7B:
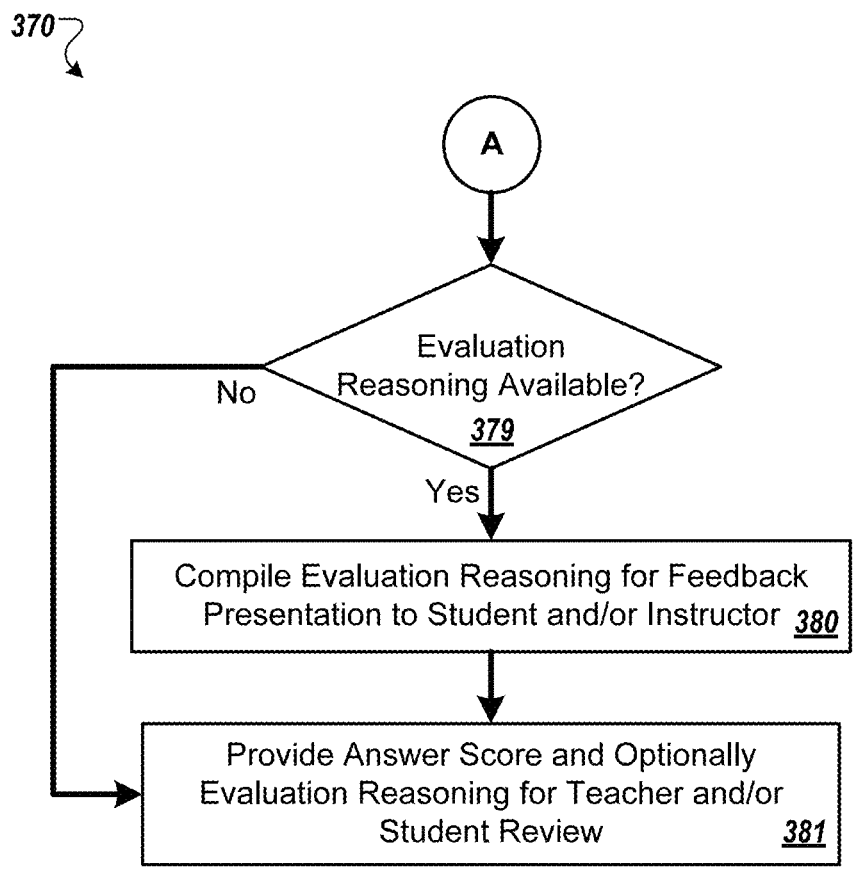

FIG. 7A and FIG. 7B illustrate a flow chart of the example method 370 for evaluating the results of machine learning analysis applied to N-gram vectorized forms of freeform answers. Portions of the method 370 may be performed by the score calculating engine 118 of FIG. 1A and/or FIG. 1B, the student clustering engine 120 of FIG. 1A and/or FIG. 1B, and/or the learning resource recommendation engine 134 of FIG. 1A and/or FIG. 1B.

Turning to FIG. 7A, in some implementations, the method 370 begins with receiving machine learning model outputs and freeform answer information (372). The freeform answer information, in some examples, may identify the learner, the question, the learning unit, and/or an age/learning level of the learner. The ML model outputs and freeform answer information may be received from the method 320*a* of FIG. 4A through FIG. 4C, or from the method 320*b* of FIG. 5A and FIG. 5B. In some embodiments, the automated evaluation engine 116*a* of FIG. 1A or the automated evaluation engine 116*b* of FIG. 1B provides the ML model outputs as ML analysis results 156.

In some implementations, if the evaluation is being used for scoring (374), section evaluations are aggregated to obtain an answer score (376). The machine learning output, for example, may be converted to an overall score or rating such as a grade, percentage points from 0 to 100, or other scoring form as described, for example, in relation to the score calculating engine 118 of FIG. 1A and/or FIG. 1B. In some embodiments, straight aggregation is performed (e.g., all ML model contributions weighted equally). In other embodiments, the ML model contributions are combined using a scoring algorithm that applies weights to certain ML model contributions. The ML model contributions, in some embodiments, are combined using automated scoring rules 142, as described in relation to the score calculating engine 118 of FIG. 1A and/or FIG. 1B.

In some implementations, if the answer score meets a manual scoring rule (378), the student's freeform answer is queued for manual scoring (382). The manual scoring rule(s) may include thresholds for both high scoring and low scoring. In a particular example, a perfect score may be manually verified. For example, as described in relation to the manual scoring GUI engine 122 of FIG. 1A and/or FIG. 1B, the student's freeform answer may be queued for double checking by a teacher or other learning professional. The student's freeform answer may be scored according to a same or similar scoring rubric as followed by the automated scoring rules 142 (described in relation to FIG. 1A).

Turning to FIG. 7A and FIG. 7B, in some implementations, if the answer score does not meet a manual scoring rule (378), if evaluation reasoning is available (379), the evaluation reasoning is compiled for feedback presentation to the student and/or instructor (380). The evaluation reasoning, for example, may be derived from the ML analysis results 156 of FIG. 1A and/or the AI analysis results 166 of FIG. 1B. The automated feedback engine 172 of FIG. 1B, for example, may compile the feedback for presentation.

In some implementations, the answer score (and, optionally, the evaluation reasoning) is provided for teacher review and/or for student review (381). For example, the answer score and/or evaluation reasoning may be presented by the student GUI engine 112 and/or the teacher GUI engine 128 of FIG. 1A and/or FIG. 1B.

Returning to FIG. 7A, in some implementations, rather than and/or in addition to the evaluation being used for scoring (374), the section evaluations are aggregated to obtain a subject proficiency evaluation (384). The scores and/or feedback, for example, may be collected for use in evaluating for subject proficiency.

In some implementations, the evaluation is used for recommending a next learning activity (386). The scoring should provide an assessment of the learner's comfort level with the subject matter. Thus, the score(s) and/or machine learning evaluation may be provided to a recommendation process (388) for recommending additional learning materials. The recommendation process, for example, may be performed by the learning resource recommendation engine 134 of FIG. 1A and/or FIG. 1B.

In some implementations, rather than and/or in addition to the evaluation being used for recommending a next learning activity, the scores and/or the machine learning evaluation may be provided to a student clustering process (390) for grouping students by proficiency level. The student clustering process, for example, may group students based on their proficiency in one or more learning areas, for example to assist in presenting appropriate materials to them and/or for generating comparison metrics related to each grouping. The student clustering engine 120 of FIG. 1A and/or FIG. 1B, for example, may cluster students based in part on the student clustering rules 150.

Although presented as a particular series of operations, in other embodiments, the method 370 includes more or fewer operations. For example, in some embodiments, if the evaluation process is being used for student clustering (390) and/or for recommending additional learning activities (388), the scoring rubric may differ. For example, while an evaluation provided to a student may be presented in letter grade format, a percentage points or other mathematical leveling evaluation may be used for student clustering and/or recommendation purposes. In some embodiments, certain operations of the method 370 are performed concurrently and/or in a different order. For example, the score may be presented for teacher and/or student review (380) while the freeform answer is also queued for manual scoring (382). Other modifications of the method 370 are possible.

Returning to FIG. 3, although presented as a particular series of operations, in other embodiments, the method 300 includes more or fewer operations. For example, in addition to applying the spelling/grammar algorithm, the method 300 may include scoring a grammar/spelling portion of the answer. The scoring, for example, may be optional based upon student age and/or ability. Other modifications of the method 300 are possible.

Figure 9:
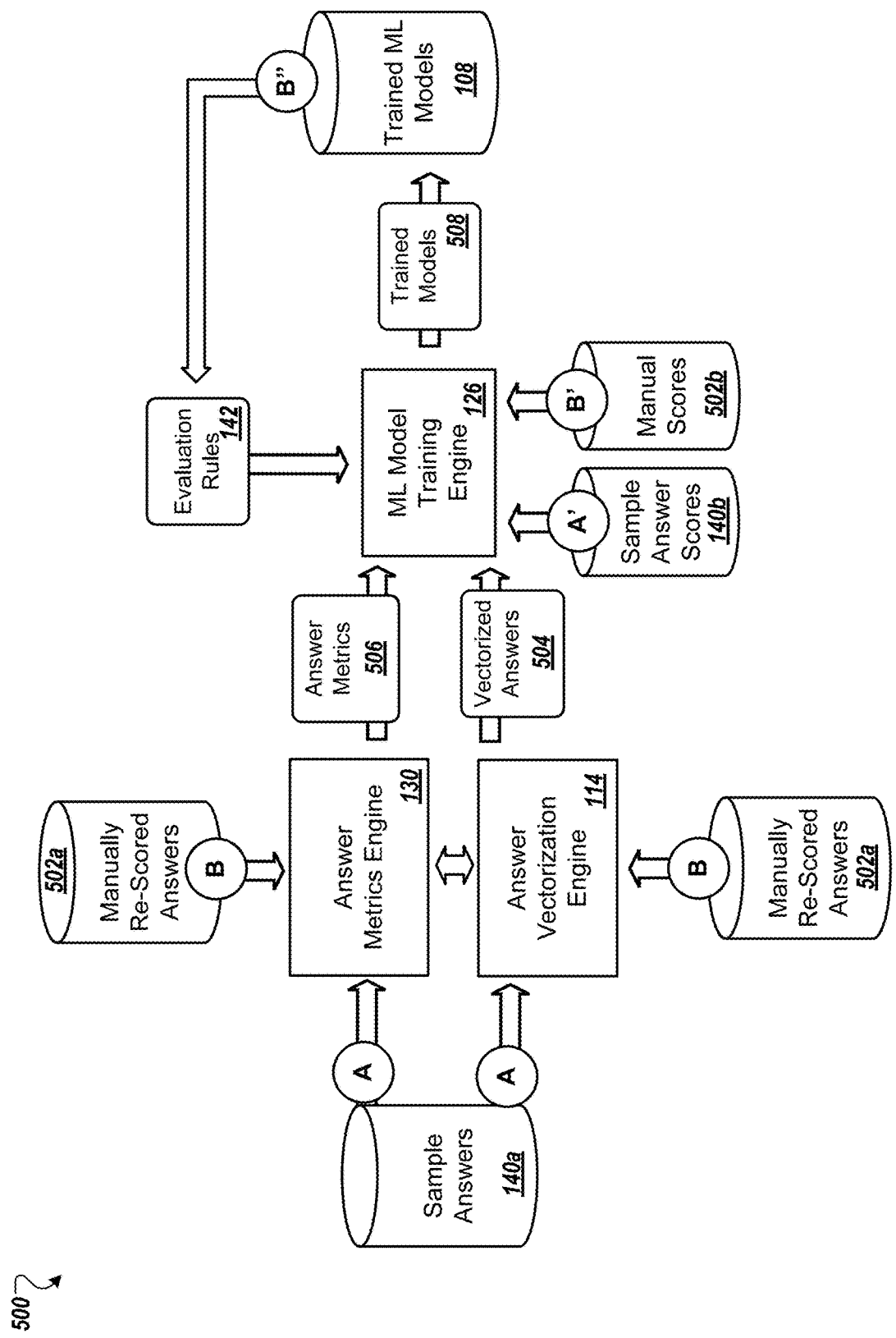
FIG. 9 is a flow diagram of an example process for training machine learning models to automatically evaluate vectorized free-form answers to multi-dimensional reasoning questions.

FIG. 9 is a flow diagram of an example process 500 for training machine learning models to automatically score vectorized free-form answers to multi-dimensional reasoning questions. The process 500, for example, may be performed by the automated evaluation system 102*a* of FIG. 1A.

In some implementations, in a first round of training, the set of sample answers 140*a* is provided to the answer vectorization engine 114 for generating one or more vectorized forms 504 of each sample answer 140*a*. Further, for each sample answer 140*a*, the answer metrics engine 130 may coordinate with the answer vectorization engine 114 to generate answer metrics 506 related to one or more vectorized forms of the sample answers 140*a* generated by the answer vectorization engine 114. The answer metrics engine 130, further, may generate one or more metrics related to each of the sample answers 140*a* prior to vectorization (e.g., token count, etc.).

In some embodiments, the vectorized forms 504 of the sample answers 140 and the corresponding answer metrics 506 are accessed by the machine learning model training engine 126 for training one or more models. The machine learning model training engine 126, for example, may feed the vectorized answers 504, the corresponding answer metrics 506, and the set of sample answer scores 140*b* corresponding to the sample answers 140*a* to one or more tree-based machine learning classifiers. The type(s) of tree-based machine learning classifiers used, in some embodiments, may be selected by the ML model training engine 126 based in part on the set of evaluation rules 142. The set of evaluation rules 142, further, may designate combinations of vectorized answers 504, such as a first combination composed of the vectorized form of the claim section of the sample answer with the vectorized form of the evidence section of the sample answer and a second combination composed of the vectorized form of the evidence section of the sample answer with the vectorized form of the reasoning section of the sample answer. The ML model training engine 126 generates, from the answer metrics 506, the vectorized answers 504, and the sample answer scores 140*b*, a set of trained models 508 for storing as the trained machine learning models 108.

As the trained machine learning models 108 are applied to automatically evaluating freeform answers formatted in a multi-section answer architecture, in some embodiments, a set of manually re-scored answers 502*a* are collected. The manually re-scored answers 502*a*, for example, may be generated from automatically identified freeform answers that the trained ML models 108 evaluated to have a score matching the automated scoring rules 142, as described in relation to FIG. 1A. The manually re-scored answers 502*a* may correspond, for example, to freeform answers scored by the trained ML models 108 as being perfect (e.g., 100% points allocated) and/or very poor (e.g., up to 10% points allocated, up to 5% points allocated, or 0 points allocated) scores. In manually re-scoring answers corresponding to ML model evaluation outputs on the edges of the scoring spectrum, a small number of training updates may be used to refine the trained ML models 108 in a targeted fashion.

In some implementations, the manually re-scored answers 502*a* are provided to the answer vectorization engine 114 and the answer metrics engine 130 to generate the vectorized answers 504 and the answer metrics 506. The manually re-scored answers 502*a* may be used to re-train the trained ML models 108, in some examples, each time a manually re-scored answer 502*a* is available, every time a threshold number (e.g., 5, 10, 20, etc.) of manually re-scored answers are made available, and/or on a periodic basis.

In some implementations, the vectorized answers 504 and the answer metrics 506 generated from the manually re-scored answers 502*a*, along with any trained ML model 108 corresponding to the manually re-scored answers 502*a* (e.g., same question, same topic area, same answer section format, and/or same learning unit, etc.) as well as the manual scores 502*b* corresponding to the manually re-scored answers 502*a* are provided to the ML model training engine 126 to update the corresponding trained ML models 108 as the trained models 508.

Figure 10:
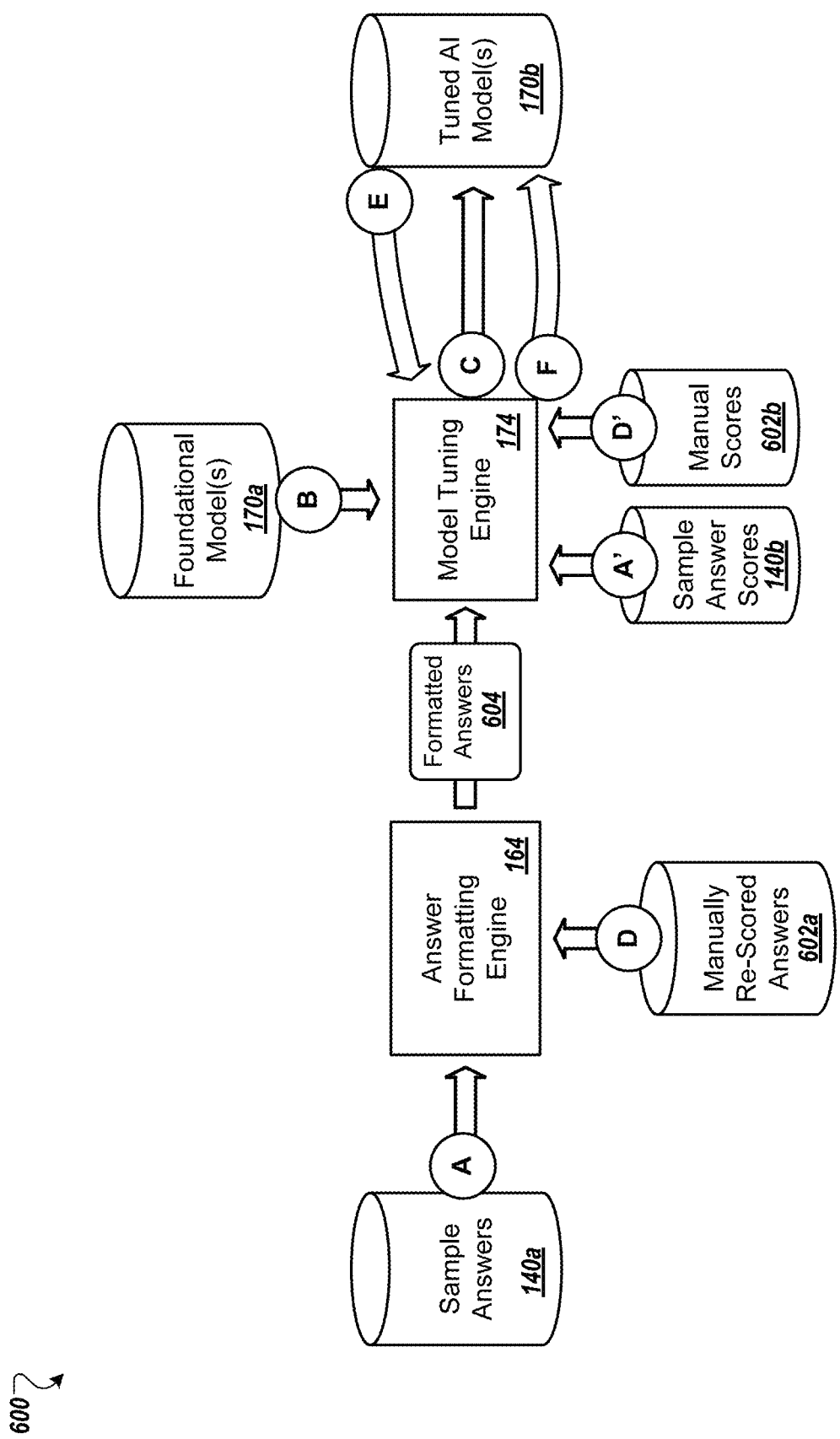
FIG. 10 is a flow diagram of an example process for tuning artificial intelligence models to automatically evaluate free-form answers to multi-dimensional reasoning questions.

Turning to FIG. 10, a flow diagram of an example process 600 for tuning artificial intelligence models to automatically score free-form answers to multi-dimensional reasoning questions is presented. The process 600, for example, may be performed by the automated evaluation system 102*b* of FIG. 1B.

In some implementations, in a first round of tuning, the set of sample answers 140*a* is provided to the answer formatting engine 164 for generating one or more formatted versions 604 of each sample answer 140*a*.

In some embodiments, the formatted answers 604 are accessed by the model tuning engine 174 of FIG. 1B for tuning one or more foundational models 170. The model tuning engine 174, for example, may feed the formatted answers 604 and the set of sample answer scores 140*b* corresponding to the sample answers 140*a* to one or more foundational models 170*a* to tune the foundational model(s) 170*a* for performing automated analysis according to the sample answers 140*a*. The AI model tuning engine 174 causes adjustments of the functionality of one or more of the foundational models 170, converting them to tuned AI model(s) 170*b*.

As the tuned model(s) 170*b* are queried to automatically evaluate freeform answers formatted in a multi-section answer architecture, in some embodiments, a set of manually re-scored answers 602*a* are collected. The manually re-scored answers 602*a*, for example, may be generated from automatically identified freeform answers that the tuned AI models 170*b* evaluated to have a score matching the automated scoring rules 142, as described in relation to FIG. 1A. The manually re-scored answers 602*a* may correspond, for example, to freeform answers scored by the tuned AI models 170*b* as being perfect scores (e.g., 100% points allocated) and/or very poor scores (e.g., up to 10% points allocated, up to 5% points allocated, or 0 points allocated). In manually re-scoring answers corresponding to AI model evaluation outputs on the edges of the scoring spectrum, a small number of training updates may be used to refine the tuned AI models 170*b* in a targeted fashion.

In some implementations, the manually re-scored answers 602*a* are provided to the answer formatting engine 164 to generate further formatted answers 604. The manually re-scored answers 602a may be used to refine tuning of the tuned AI models 170b, in some examples, each time a manually re-scored answer 602a is available, every time a threshold number (e.g., 5, 10, 20, etc.) of manually re-scored answers are made available, and/or on a periodic basis.

In some implementations, the formatted answers 604, along with any tuned AI model 170b corresponding to the manually re-scored answers 602a (e.g., same question, same topic area, same answer section format, and/or same learning unit, etc.) as well as the manual scores 602b corresponding to the manually re-scored answers 602a are provided to the AI model tuning engine 174 to refine the tuning of the corresponding tuned AI models 170b.

Reference has been made to illustrations representing methods and systems according to implementations of this disclosure. Aspects thereof may be implemented by computer program instructions. These computer program instructions may be provided to a processor of a general-purpose computer, special purpose computer, or other programmable data processing apparatus and/or distributed processing systems having processing circuitry, such that the instructions, which execute via the processor of the computer or other programmable data processing apparatus, create means for implementing the functions/operations specified in the illustrations.

One or more processors can be utilized to implement various functions and/or algorithms described herein. Additionally, any functions and/or algorithms described herein can be performed upon one or more virtual processors. The virtual processors, for example, may be part of one or more physical computing systems such as a computer farm or a cloud drive.

Aspects of the present disclosure may be implemented by software logic, including machine readable instructions or commands for execution via processing circuitry. The software logic may also be referred to, in some examples, as machine readable code, software code, or programming instructions. The software logic, in certain embodiments, may be coded in runtime-executable commands and/or compiled as a machine-executable program or file. The software logic may be programmed in and/or compiled into a variety of coding languages or formats.

Aspects of the present disclosure may be implemented by hardware logic (where hardware logic naturally also includes any necessary signal wiring, memory elements and such), with such hardware logic able to operate without active software involvement beyond initial system configuration and any subsequent system reconfigurations (e.g., for different object schema dimensions). The hardware logic may be synthesized on a reprogrammable computing chip such as a field programmable gate array (FPGA) or other reconfigurable logic device. In addition, the hardware logic may be hard coded onto a custom microchip, such as an application-specific integrated circuit (ASIC). In other embodiments, software, stored as instructions to a non-transitory computer-readable medium such as a memory device, on-chip integrated memory unit, or other non-transitory computer-readable storage, may be used to perform at least portions of the herein described functionality.

Various aspects of the embodiments disclosed herein are performed on one or more computing devices, such as a laptop computer, tablet computer, mobile phone or other handheld computing device, or one or more servers. Such computing devices include processing circuitry embodied in one or more processors or logic chips, such as a central processing unit (CPU), graphics processing unit (GPU), field programmable gate array (FPGA), application-specific integrated circuit (ASIC), or programmable logic device (PLD). Further, the processing circuitry may be implemented as multiple processors cooperatively working in concert (e.g., in parallel) to perform the instructions of the inventive processes described above.

The process data and instructions used to perform various methods and algorithms derived herein may be stored in non-transitory (i.e., non-volatile) computer-readable medium or memory. The claimed advancements are not limited by the form of the computer-readable media on which the instructions of the inventive processes are stored. For example, the instructions may be stored on CDs, DVDs, in FLASH memory, RAM, ROM, PROM, EPROM, EEPROM, hard disk or any other information processing device with which the computing device communicates, such as a server or computer. The processing circuitry and stored instructions may enable the computing device to perform, in some examples, the method 300 of FIG. 3, the method 320a of FIG. 4A through FIG. 4C, the method 320b of FIG. 5A and FIG. 5B, the method 360 of FIG. 6, the method 370 of FIG. 7A and FIG. 7B, and/or the process 500 of FIG. 9.

These computer program instructions can direct a computing device or other programmable data processing apparatus to function in a particular manner, such that the instructions stored in the computer-readable medium produce an article of manufacture including instruction means which implement the function/operation specified in the illustrated process flows.

Embodiments of the present description rely on network communications. As can be appreciated, the network can be a public network, such as the Internet, or a private network such as a local area network (LAN) or wide area network (WAN) network, or any combination thereof and can also include PSTN or ISDN sub-networks. The network can also be wired, such as an Ethernet network, and/or can be wireless such as a cellular network including EDGE, 3G, 4G, and 5G wireless cellular systems. The wireless network can also include Wi-Fi®, Bluetooth®, Zigbee®, or another wireless form of communication. The network, for example, may support communications between the automated evaluation system 102a,b and the student devices 104 and/or the teacher devices 106 of FIG. 1A and FIG. 1B.

The computing device, in some embodiments, further includes a display controller for interfacing with a display, such as a built-in display or LCD monitor. A general purpose I/O interface of the computing device may interface with a keyboard, a hand-manipulated movement tracked I/O device (e.g., mouse, virtual reality glove, trackball, joystick, etc.), and/or touch screen panel or touch pad on or separate from the display. The display controller and display may enable presentation of the screen shots 400 and 420 illustrated, in some examples, in FIG. 8A and FIG. 8B.

Moreover, the present disclosure is not limited to the specific circuit elements described herein, nor is the present disclosure limited to the specific sizing and classification of these elements. For example, the skilled artisan will appreciate that the circuitry described herein may be adapted based on changes in battery sizing and chemistry or based on the requirements of the intended back-up load to be powered.

The functions and features described herein may also be executed by various distributed components of a system. For example, one or more processors may execute these system functions, where the processors are distributed across multiple components communicating in a network. The distributed components may include one or more client and server machines, which may share processing, in addition to various human interface and communication devices (e.g., display monitors, smart phones, tablets, personal digital assistants (PDAs)). The network may be a private network, such as a LAN or WAN, or may be a public network, such as the Internet. Input to the system, in some examples, may be received via direct user input and/or received remotely either in real-time or as a batch process.

Although provided for context, in other implementations, methods and logic flows described herein may be performed on modules or hardware not identical to those described. Accordingly, other implementations are within the scope that may be claimed.

In some implementations, a cloud computing environment, such as Google Cloud Platform™ or Amazon™ Web Services (AWS™), may be used perform at least portions of methods or algorithms detailed above. The processes associated with the methods described herein can be executed on a computation processor of a data center. The data center, for example, can also include an application processor that can be used as the interface with the systems described herein to receive data and output corresponding information. The cloud computing environment may also include one or more databases or other data storage, such as cloud storage and a query database. In some implementations, the cloud storage database, such as the Google™ Cloud Storage or Amazon™ Elastic File System (EFS™), may store processed and unprocessed data supplied by systems described herein. For example, the contents of the data store 110a of FIG. 1A, the contents of the data store 110b of FIG. 1B, the sample answers 140a and sample answer scores 140b of FIG. 9, and/or the manually re-scored answers 502a and corresponding manually applied scores 502b of FIG. 9 may be maintained in a database structure.

The systems described herein may communicate with the cloud computing environment through a secure gateway. In some implementations, the secure gateway includes a database querying interface, such as the Google BigQuery™ platform or Amazon RDS™. The data querying interface, for example, may support access by the automated evaluation system 102a to at least portions of the data of the data store 110a of FIG. 1A.

The systems described herein may include one or more artificial intelligence (AI) networks (e.g., neural networks) for natural language processing (NLP) of text inputs. The AI networks, in some examples, can include a synaptic neural network, a deep neural network, a transformer neural network, and/or a generative adversarial network (GAN). The AI networks may be trained using one or more machine learning techniques and/or classifiers such as, in some examples, anomaly detection, clustering, and/or supervised and/or association. In one example, the AI networks may be developed and/or based on a bidirectional encoder representations for transformers (BERT) model by Google of Mountain View, CA.

The systems described herein may communicate with one or more foundational model systems (e.g., artificial intelligence neural networks). The foundational model system(s), in some examples, may be developed, trained, tuned, fine-tuned, and/or prompt engineered to evaluate text inputs such as the student answers 168 of FIG. 1B. The foundational model systems, in some examples, may include or be based off of the generative pre-trained transformer (GPT) models available via the OpenAI platform by OpenAI of San Francisco, CA (e.g., GPT-3, GPT-3.5, and/or GPT-4) and/or the generative AI models available through Azure OpenAI or Vertex AI by Google of Mountain View, CA (e.g., PaLM 2). Multiple foundational model systems may be applied based on audience (e.g., student, teacher, level of student, learning topic, evaluation rubric, etc.). In another example, a single foundational model system may be dynamically adapted based on user demographic and/or topic context. In illustration, a single large language model (LLM) for use in natural language processing (NLP) of student texts may be queried using differing engineered prompts based on the demographic and/or topic context.

While certain embodiments have been described, these embodiments have been presented by way of example only, and are not intended to limit the scope of the present disclosures. Indeed, the novel methods, apparatuses and systems described herein can be embodied in a variety of other forms; furthermore, various omissions, substitutions and changes in the form of the methods, apparatuses and systems described herein can be made without departing from the spirit of the present disclosures. The accompanying claims and their equivalents are intended to cover such forms or modifications as would fall within the scope and spirit of the present disclosures.

What is claimed is:

1. A system for automatically evaluating content of freeform answers, the system comprising:
 a non-volatile data store comprising a plurality of multi-dimensional reasoning questions related to one or more subjects;
 a plurality of artificial intelligence (AI) models, each respective AI model of the plurality of AI models being fine-tuned in evaluating freeform answers according to a standardized framework for organizing freeform answers by providing a respective set of historic answers and a respective set of corresponding answer scores to the respective AI model; and
 processing circuitry configured to perform operations comprising
  obtaining a freeform answer to a given multi-dimensional reasoning question of the plurality of multi-dimensional reasoning questions, the freeform answer comprising a corresponding section text for each respective section of a predetermined section structure of the freeform answer, wherein
   the corresponding section text of each respective section comprises one or more sentences, and
   the predetermined section structure comprises at least three sections defined by the standardized framework, each section of the at least three sections having a different goal of a set of goals of the predetermined section structure,
  for each respective section of the predetermined section structure,
   performing a respective section content evaluation by communicating at least one engineered model prompt to each model of one or more AI models of the plurality of AI models to instruct evaluation of the corresponding section text for that respective section in view of a given goal of the set of goals for the respective section, thereby obtaining at least one section content score,
  identifying another AI model of the plurality of AI models configured to evaluate logical connections between the section text of adjacent sections of the predetermined section structure,
  performing a logical connection evaluation by communicating one or more engineered model prompts to the another AI model to instruct evaluation of logical flow between the corresponding section texts of respective sections that are adjacent in the predetermined section structure, thereby obtaining at least one logical connection score, and calculating, using the at least one section content score and the at least one logical connection score, at least one overall score corresponding to the freeform answer.

2. The system of claim 1, wherein the one or more AI models comprises the another AI model.

3. The system of claim 1, further comprising, for each respective section of the predetermined section structure, formatting the corresponding section text of the respective section into formatted section text.

4. The system of claim 1, wherein:

performing the respective section content evaluation comprises obtaining, from each AI model of at least one AI model of the one or more AI models, a respective evaluation reasoning corresponding to one or more section content scores of the at least one section content score; and the operations further comprise preparing, using the respective evaluation reasoning for each AI model of the at least one AI model, a feedback message, and providing, to a remote computing device of an end user, the feedback message.

5. The system of claim 4, wherein the feedback message comprises an explanation or an actionable suggestion.

6. The system of claim 4, wherein:

the end user is a student; and the feedback message is provided in real-time or near-real-time.

7. The system of claim 1, wherein the operations further comprise selecting, based at least in part on an evaluation rubric corresponding to the freeform answer, the one or more AI models.

8. The system of claim 1, wherein the operations further comprise:

applying one or more manual scoring rules to the at least one overall score; and based on the applying indicating that the freeform answer qualifies for manual scoring, queueing the freeform answer for manual review.

9. The system of claim 8, wherein the operations further comprise:

obtaining at least one manually calculated score from the manual review; and providing the corresponding section text of each respective section of the predetermined section structure and the at least one manually calculated score for tuning at least one AI model of i) the one or more AI models and/or ii) the another AI model.

10. The system of claim 8, wherein the one or more manual scoring rules comprises identifying any perfect scores.

11. The system of claim 1, wherein the operations further comprise:

identifying a plurality of freeform answers having each received, through the calculating, one or more perfect scores of the at least one overall score; and updating the fine-tuning of at least one AI model of the plurality of AI models using the plurality of freeform answers.

12. A method for automatically evaluating content of freeform answers, the method comprising:

tuning, by processing circuitry, a plurality of artificial intelligence (AI) models to evaluate freeform answers according to a standardized framework for organizing freeform answers, wherein the tuning of each respective AI model of the plurality of AI models comprises providing a respective set of historic answers and a respective set of corresponding answer scores to the respective AI model;

obtaining, via a text entry user interface of an electronic learning platform, corresponding section text for each respective section of a plurality of text sections of a freeform answer to a given multi-dimensional reasoning question of a plurality of multi-dimensional reasoning questions of the electronic learning platform, wherein the freeform answer is organized according to the standardized framework and comprises a predetermined section structure, wherein the predetermined section structure comprises at least three sections, each section of the at least three sections having a different goal of a set of goals of the predetermined section structure, and the corresponding section text of each respective section comprises one or more sentences;

formatting, by the processing circuitry, the corresponding section text for each respective text section of the plurality of text sections for submission to at least one respective AI model of the plurality of AI models;

for each respective text section of the plurality of text sections, submitting, by the processing circuitry, the formatted corresponding section text and at least one engineered model prompt for the respective text section to a first at least one AI model of the plurality of AI models to form a content evaluation of the respective text section in view of a given goal of the set of goals for the respective section;

submitting, by the processing circuitry, the formatted corresponding section texts of each respective text section of the plurality of text sections and one or more engineered model prompts to a second at least one AI model of the plurality of AI models to instruct evaluation of logical flow between the formatted corresponding section texts of adjacent text sections in the plurality of text sections; and calculating, based at least in part on the respective content evaluation for each of the respective text sections of the plurality of text sections and the evaluation of the logical flow, at least one score corresponding to the freeform answer.

13. The method of claim 12, further comprising causing presentation of the text entry user interface at a display of a remote computing device, wherein the text entry user interface comprises a separate text entry pane for each text section of the plurality of text sections.

14. The method of claim 12, wherein formatting the corresponding section text of each respective section comprises discarding, from a plurality of tokens of the corresponding section text of each respective text section, punctuation and/or determinatives.

15. The method of claim 12, further comprising:

submitting, by the processing circuitry, the corresponding section text of each respective section of the plurality of text sections to a third at least one AI model of the one or more AI models to form a stylistic and/or grammatical quality evaluation of the freeform answer;

wherein calculating the at least one score comprises calculating the at least one score further using the stylistic and/or grammatical quality evaluation.

16. The method of claim 12, further comprising:
identifying, by the processing circuitry, a plurality of freeform answers having each received, through the calculating, one or more perfect scores of the at least one score; and
updating the tuning, by the processing circuitry, of at least one AI model of the plurality of AI models using the plurality of freeform answers.

17. The method of claim 12, wherein at least a portion of the each respective set of historic answers comprises a set of answers submitted by a plurality of learners of the electronic learning platform and manually scored by a set of professionals to obtain the respective set of corresponding answer scores.

18. The method of claim 12, further comprising providing, by the processing circuitry, the at least one score to a recommendation process for selecting a next learning activity for a learner.

19. The method of claim 12, further comprising:
applying one or more manual scoring rules to the at least one score;
based on the applying indicating that the freeform answer qualifies for manual scoring, queueing the freeform answer for manual review;
obtaining at least one manually calculated score from the manual review; and
providing the corresponding section text of each respective section of the predetermined section structure and the at least one manually calculated score for updating the tuning of at least one AI model of the plurality of AI models.

* * * * *